US006581546B1

(12) United States Patent
Dalland et al.

(10) Patent No.: US 6,581,546 B1
(45) Date of Patent: Jun. 24, 2003

(54) ANIMAL CONTAINMENT SYSTEM HAVING A DYNAMICALLY CHANGING PERIMETER

(75) Inventors: Donald G. Dalland, Mantorville, MN (US); Gerald Walter Grabowski, Minneapolis, MN (US)

(73) Assignee: Waters Instruments, Inc., Rochester, MN (US)

( * ) Notice: Subject to any disclaimer, the term of this patent is extended or adjusted under 35 U.S.C. 154(b) by 0 days.

(21) Appl. No.: 10/076,717

(22) Filed: Feb. 14, 2002

(51) Int. Cl.[7] .............................................. A01K 15/04
(52) U.S. Cl. ....................................... 119/712; 119/721
(58) Field of Search ............................... 119/712, 174, 119/719, 720, 721

(56) References Cited

U.S. PATENT DOCUMENTS

| | | | |
|---|---|---|---|
| 4,745,882 A | 5/1988 | Yarnall, et al. | |
| 4,918,425 A | 4/1990 | Greenberg et al. | |
| 4,924,211 A | 5/1990 | Davies | |
| 5,067,441 A | 11/1991 | Weinstein | |
| 5,379,224 A | 1/1995 | Brown et al. | |
| 5,381,129 A | 1/1995 | Boardman | |
| 5,390,124 A | 2/1995 | Kyrtsos | |
| 5,425,330 A | 6/1995 | Touchton et al. | |
| 5,568,119 A | 10/1996 | Schipper et al. | |
| 5,594,425 A | 1/1997 | Ladner et al. | |
| 5,642,690 A | 7/1997 | Calabrese et al. | |
| 5,791,294 A | 8/1998 | Manning | |
| 5,857,433 A | 1/1999 | Files | |
| 5,868,100 A * | 2/1999 | Marsh | 119/421 |
| 5,892,454 A | 4/1999 | Schipper et al. | |
| 5,949,350 A | 9/1999 | Girard et al. | |
| 5,956,660 A | 9/1999 | Neumann | |
| 6,028,514 A | 2/2000 | Lemelson et al. | |
| 6,029,111 A | 2/2000 | Croyle | |
| 6,032,084 A | 2/2000 | Anderson et al. | |
| 6,043,748 A | 3/2000 | Touchton et al. | |
| 6,067,018 A | 5/2000 | Skelton et al. | |
| 6,067,044 A | 5/2000 | Whelan et al. | |
| 6,088,653 A | 7/2000 | Sheikh et al. | |
| 6,115,679 A | 9/2000 | Rutter et al. | |
| 6,122,960 A | 9/2000 | Hutchings et al. | |
| 6,158,392 A | 12/2000 | Andre et al. | |
| 6,160,481 A | 12/2000 | Taylor, Jr. | |
| 6,172,640 B1 | 1/2001 | Durst et al. | |
| 6,431,122 B1 * | 8/2002 | Westrick et al. | 119/721 |

OTHER PUBLICATIONS

Toronto Star, Dec. 26, 1994, Page 5, Section F, Newspaper Article, "Collaring the Market for the Tracking Animals," by Andrew Trimble, Copyright owner –Southham Business Communications, Inc.

"Tracking Elephants: From the Ground and by Satellite", Michael Stuewe website: www.si.edu/elephant/eletelem.htm.

\* cited by examiner

Primary Examiner—Yvonne Abbott
(74) Attorney, Agent, or Firm—Fredrikson & Byron, P.A.

(57) ABSTRACT

The present invention provides for animal containment through a system having a containment collar and GPS (Global Positioning System), RF (Radio Frequency), or INS (Inertial Navigation System) data, or a combination thereof, to define the perimeter of a containment area. A receiver is mounted to the containment collar, worn by an animal, which contains positioning electronics, memory and warning outputs. The user defines the perimeter by programming "waypoints" (positions on the perimeter) into the collar. The system provides an audible warning when the animal is within a user programmable distance of the perimeter, and then provides an adjustable correction, such as an electrical impulse to the animal when the perimeter boundaries are exceeded. Upon perimeter violation and initial correction of the animal, the system dynamically changes the position of the boundary encompassing the animal's current but prohibited position. Then the dynamic boundary may be gradually or incrementally changed so as to direct the animal toward the original perimeter. This in effect creates an "amnesty alley" or a bubble/bulge in the perimeter so the animal is not continuously corrected and can go back within the original perimeter without correction. The boundary then returns to its original configuration once the animal is back inside the perimeter.

36 Claims, 13 Drawing Sheets

Fig. 13

POSITION A: USER DEFINED, DESIRED PERIMETER, ESTABLISHED BY PRESSING INPUT BUTTON ESTABLISHING THRESHOLD RF SIGNAL AT DISTANCE $D_A$.

POSITING B: RECEIVER COLLAR WITHIN THE USER DEFINED PERIMETER, NO WARNING. $D_A > D_B$.

POSITION C: RECEIVER COLLAR OUTSIDE THE USER DEFINED PERIMETER, WARNING STARTS, $D_A < D_C$.

POSITION D: RECEIVER COLLAR INITIATES WARNING FOR X PERIOD OF TIME, THEN RE-ESTABLISHES PERIMETER AT POSITION D, DISTANCE $D_D$, WHERE: $D_D > D_C > D_A$.

POSITION E: AS RECEIVER DISTANCE $D_E$ APPROACHES $D_A$, PERIMETER RETURNS TO ORIGINAL DESIRED PERIMETER AT DISTANCE $D_A$. WHERE $D_A = D_E$.

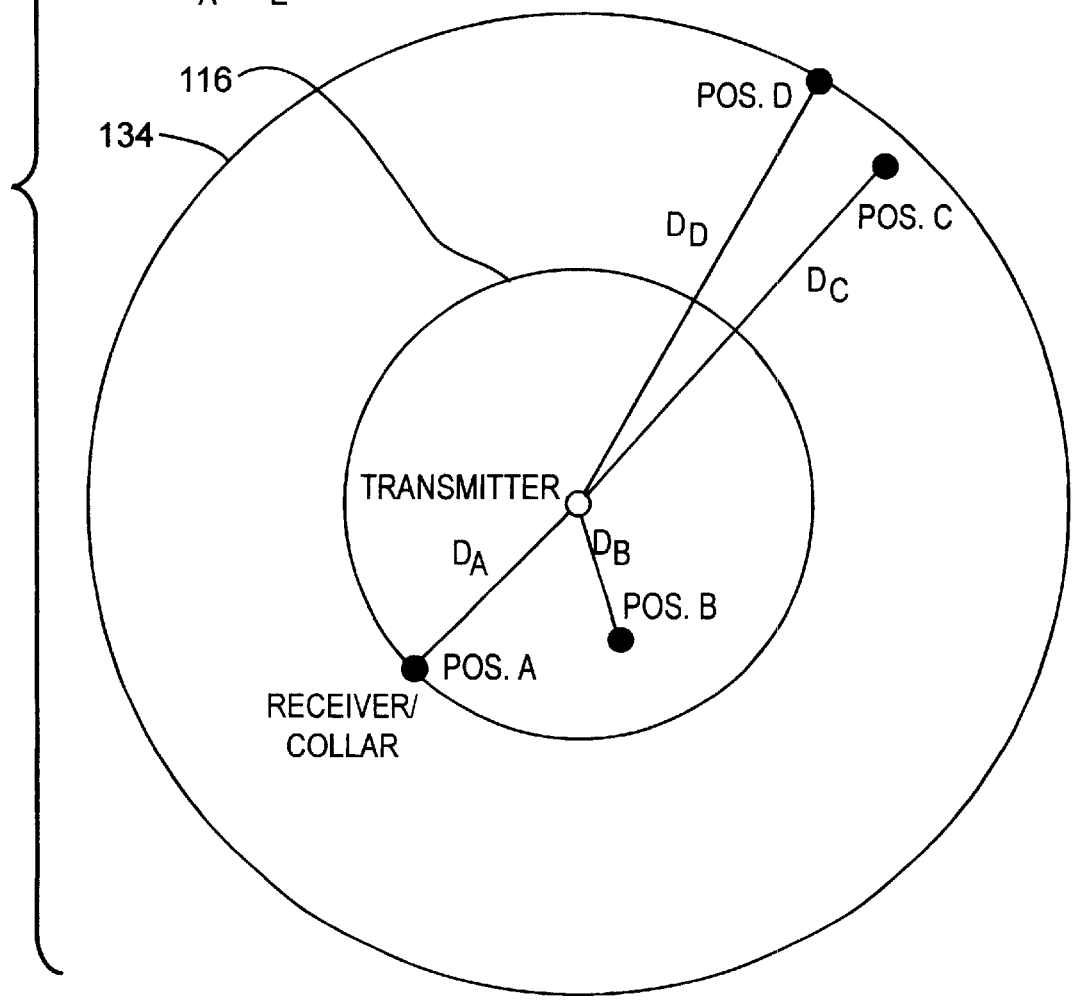

US 6,581,546 B1

ANIMAL CONTAINMENT SYSTEM HAVING A DYNAMICALLY CHANGING PERIMETER

FIELD OF THE INVENTION

The present invention generally relates to animal containment systems. Specifically, the invention is an apparatus and method for restricting an animal's movement without a fence or invisible barrier. More specifically the invention relates to controlling an animal's movement using a dynamically changing perimeter defined by a GPS receiver, which is expandable to encircle the animal if the animal breaches the perimeter, giving the animal a return path to the original perimeter.

BACKGROUND OF THE INVENTION

Conventional and electric fencing is commonly used to control the location of animals. Barrier fencing, which physically blocks the movement of the animal is most frequently used to confine both domestic pets and farm animals. Physical electric fencing, which uses an electric shock to discourage contact with the fence, is typically used to confine commercial livestock. The purpose of an electric fence is to keep farm animals within an area, or to prevent undesired animals from entering property. High voltage electrical impulses are applied to a "live" fence wire by an energizer. This impulse lasts only thousandths of a second but is repeated every second or so. An animal, which strays into contact with the live wire, completes a circuit between the live wire and the soil. The result is an electric shock sufficiently unpleasant to cause the animal to move rapidly away from the fence before the next electrical impulse. After a few encounters, animals learn not to touch the live wire or approach the fence too closely.

In its simplest form, an electric fence comprises a single live wire elevated above the earth by a suitable means of support and electrically insulated from the earth. This basic electric fence arrangement relies on moisture in the soil to act as a conductor of electricity from the animal back to the energizer. When an animal makes contact with the live wire, the electrical impulse is conducted through the muscles of the animal, down into its legs and into the soil and through the moisture in the soil back to the energizer. This completes the electrical circuit.

An important disadvantage of electric fencing is the labor-intensive installation of the fence, which, depending on acreage, can require anywhere from a few to hundreds of man-hours. Another disadvantage is the physical presence of the fence on the property, which presents an electrical shock hazard to humans and can be unattractive. In addition, the fencing relies on peripheral elements such as the moisture in the soil in order to be effective, and may be subject to damage over time from environmental factors.

Recently, hidden electronic fences have gained popularity. Hidden fences are not physical barriers; but instead psychological barriers. Once installed, the animal will understand from experience that it cannot pass through the barrier without being disciplined/corrected. A receiver on the animal's collar administers the correction. The correction is an electrical impulse similar to the impulse administered by the physical barrier fence. It is harmless yet is unpleasant enough that the animal will want to avoid the sensation in the future.

Installation of a hidden electronic fence involves burying a boundary wire around the perimeter of the property or whatever other area to which the user wants to restrict the animal's movement. Each end of the wire is then plugged into a transmitter. Once the transmitter is switched on, it generates a signal from the wire. This signal activates the dog's receiver whenever the dog comes close to the boundary wire. Activation of the receiver can trigger an audible sound to warn the animal, or if the animal is very close to the wire, an electrical shock.

An important disadvantage of hidden electronic fencing, similar to above-ground electric fencing, is the labor-intensive installation of the fence requiring trenching or other digging in order to install the boundary wire. Another disadvantage is that if the animal runs through the barrier, they have a distinct impediment to crossing that barrier again, as the receiver is indifferent to the animal's direction of travel. Such "run-through" is a common phenomenon with fast animals such as dogs, which may become distracted and violate the perimeter in an instant after being enticed by an attractive stimulus. For example, the dog's predatory instinct may be aroused by a nearby animal, causing them to chase the animal without regard to the pending correction. After such run-through, the animal is confused or in a state of panic because it has strayed from the defined area, and may even be receiving unpleasant stimuli, but is unsure how to proceed or otherwise does not respond to the stimuli as desired. They are trapped outside of the area they are supposed to be in but may be presented with a definite disincentive to return. For example, as they approach the defined property, a warning tone may sound at their receiver, or they may receive a correction. Finally, the setting and determination of the perimeter's boundaries can be complicated, for example, by driveways, and dependent upon a location to safely place the electrical wire.

Further advancements in the technology, which are able to determine the location of an object, have led to alternative means of animal control. The United States government has placed in operation a multiple-satellite global positioning system ("GPS"). A GPS receiver receives signals from multiple satellites in orbit, and calculates the position of the receiver based on the signal data. This method of location determination is well known and the positions provided can be within ±3 meters.

Livestock confinement systems have been developed which rely upon GPS to determine the location of a receiver attached to an animal as shown in U.S. Pat. No. 5,868,100. The system uses a combination of electronic animal ear tags and GPS receiver/transmitters to control the location of livestock. The system is comprised of a lightweight, battery-powered animal ear tag that provides an audible warning and electric stimulation in response to a radio frequency signal from a fixed transmitter. The ear tag is attached to the animal and the movement of the animal is controlled based upon the location of the transmitter unit. The system is designed to exclude animals from a defined area such a stream or wetland. The system compares the position of the animal's receiver to a predefined boundary and administers a correction as the animal approaches the boundary. A system such as that of U.S. Pat. No. 5,868,100 may be more flexible than the buried wire systems since boundaries can be changed, but animals that cross the boundary may still be subject to continuous correction or otherwise be discouraged from returning to the desired location. There may also be limitations on the precision of boundary definition and location determination, which results in inconsistencies in the actual point at which the livestock are corrected. These limitations include the inability to take GPS coordinates rapidly enough to indicate the exact location of the subject at all times or the lag or error of GPS systems which can cause imprecise determination of actual receiver locations.

The ability to easily modify the restricted area is a significant advantage of GPS-based location control systems. This capability is used to control livestock grazing by easily reprogramming the restricted area to provide for maximum utilization of feeding range. Similar applications allow for monitoring by GPS systems of persons under house arrest, and their restricted area can be modified to allow for approved excursions, for example doctor appointments, as shown in U.S. Pat. No. 5,892,454. However, these applications, which allow perimeter movement based on a predetermined time or event, are limited in that they require operator intervention to program the alternative boundary.

Generally, typical GPS only systems provide at best a ±3-meter accuracy. For containment applications, accuracies of 2 meters or less are desired. Systems are available today that will achieve the necessary accuracy by utilizing a local differential transmitter, and reading another GPS band carrier signal. However, certain factors may prevent their use in a containment application. For example, the cost of such systems can range from over $1000 for a surveying receiver to over $3000 for a local transmitter. Other factors include present systems being too large for portable use, typically requiring large amounts of power resulting in short battery life, and having complicated user interfaces.

SUMMARY OF THE INVENTION

The present invention provides for animal containment through a system having a containment collar and GPS (Global Positioning System), RF (Radio Frequency), or INS (Inertial Navigation System) data or a combination thereof, to define the perimeter of a containment area. A receiver is mounted to the containment collar, or other apparatus worn by an animal, which contains positioning electronics, memory, and warning outputs. The user defines the perimeter by programming "way points" (positions on the perimeter) into the collar. The system provides an audible warning when the animal is within a user-programmable distance of the perimeter, and then provides an adjustable shock or other stimulus to the animal when the perimeter boundaries are exceeded. Upon perimeter violation and initial correction to the animal, the system dynamically changes the position of the boundary encompassing the animal's prohibited position. Then the dynamic boundary may be gradually or incrementally changed so as to direct the animal toward the original perimeter. This creates an "amnesty alley" or a bubble/bulge in the perimeter so the animal is not continuously corrected and can go back within the original perimeter without further correction. The boundary may then preferably return to its original configuration once the animal is back inside the perimeter.

The present invention thus provides for an animal containment system that uses a GPS system to dynamically change the boundary, which may change in response to a breach of the perimeter by the animal, and then may rein in the animal to prevent the animal from further straying. For example, upon perimeter violation and stimuli, if the animal does not return to the defined area, the boundary would be reset to a boundary that encompasses the animal's prohibited position. The invention thus provides for elimination of confusion or panic in an animal that has strayed from the defined area and is receiving unpleasant stimuli but is unsure how to proceed; dynamic boundaries that can be gradually or incrementally changed so as to direct an animal towards an original perimeter; global positioning satellite data to define a perimeter, the ability to program a series of GPS coordinates into a collar to define an area in which a animal may roam; to program a collar by walking it about a periphery and setting the waypoints one-by-one, and to rapidly take GPS coordinates to indicate the exact position of the animal at all times.

In one embodiment, the present invention provides for the use of a multi-axis accelerometer to adjust for lag or error of the GPS to more precisely determine the animal's location; to increase the GPS accuracy for use in a containment application; to provide an animal containment system which requires minimal labor to set up; to provide a inexpensive solution to animal containment; and to provide for an aesthetically-pleasing animal containment solution.

BRIEF DESCRIPTION OF THE DRAWINGS

FIG. 13 is a plan diagram depicting the operation of the animal containment system shown in FIG. 11 depicting the dynamically moving perimeter of the RF transmitter/receiver animal containment system.

DETAILED DESCRIPTION OF PREFERRED EMBODIMENT

Figure 1:
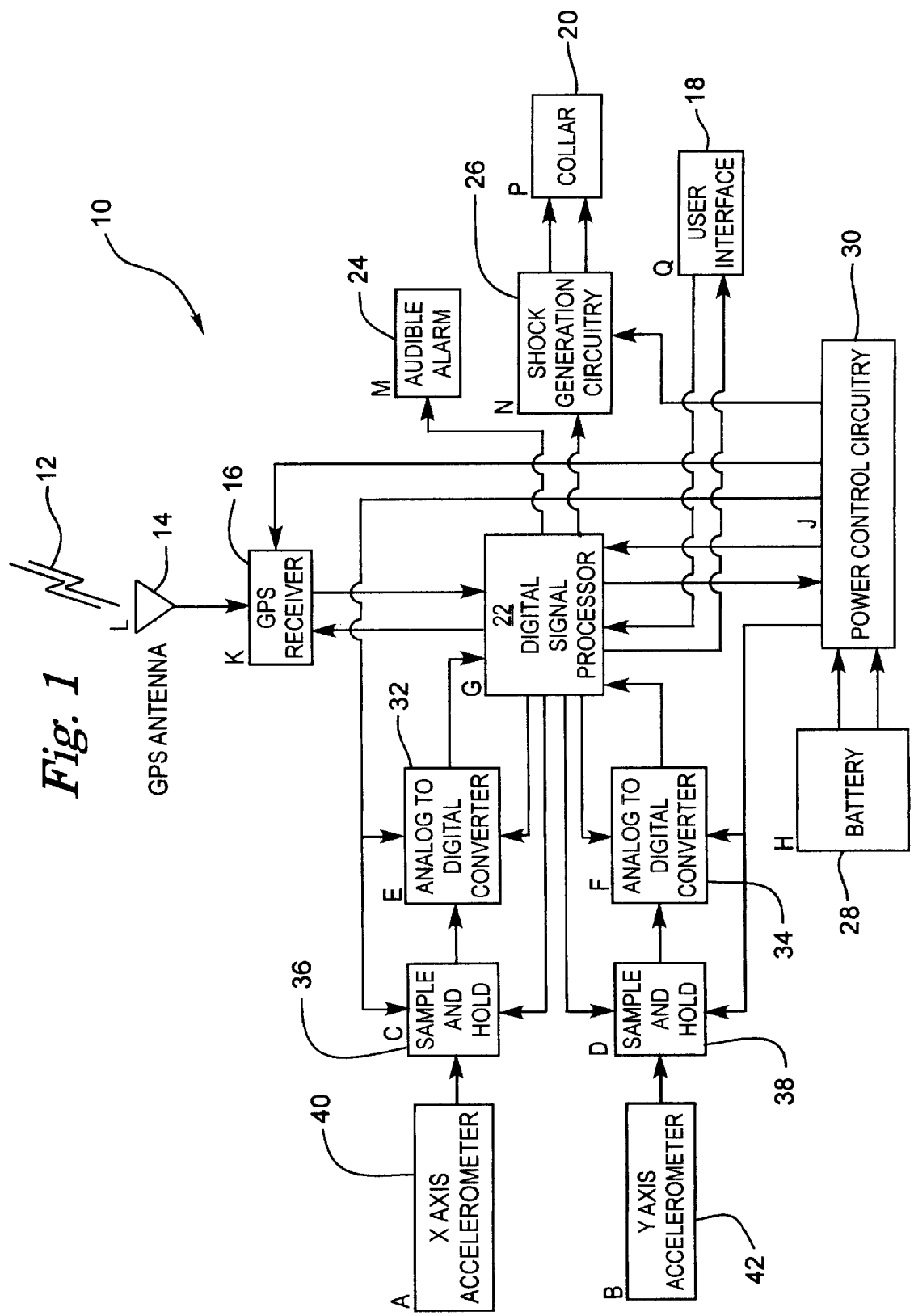
FIG. 1 is a component diagram showing the chief components of the GPS or GPS/INS animal containment system according to a representative embodiment of the present invention.

To assist in an understanding of the invention, a preferred embodiment or embodiments will now be described in detail. Reference will be frequently taken to the figures, which are summarized above. Reference numerals will be used to indicate certain parts and locations in the figures. The same reference numerals will be used to indicate the same parts or locations throughout the figures unless otherwise indicated.

FIG. 1 is a component diagram showing the chief components of the GPS or GPS/INS animal containment system according to a representative embodiment of the present invention. An animal containment system 10 is comprised of an incoming GPS signal 12, a GPS antenna 14, a GPS receiver 16, a user interface 18, an animal collar 20, a digital signal processor or microprocessor (processor) 22, an audible alarm circuit 24, a shock generation circuit 26, a battery 28, power control circuitry 30, analog-to-digital converters 32 and 34, sample and hold circuits 36 and 38, an X-axis accelerometer 40, and a Y-axis accelerometer 42.

GPS signal 12 is comprised of two microwave carrier signals. The L1 frequency (1575.42 MHz) carries the navigation message and the SPS (Standard Positioning Service) code signals. The L2 frequency (1227.60 MHz) is used to measure the ionospheric delay by PPS (Precise Positioning Service) equipped receivers. Typically three binary codes shift the L1 and/or L2 carrier phase. A C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each satellite. Their PRN number, the unique identifier for each pseudo-random-noise code, often identifies GPS satellites. The C/A code that modulates the L1 carrier is the basis for the civil SPS. The P-Code (Precise) modulates both the L1 and L2 carrier phases. The P-Code is a very long (seven days) 10 MHz PRN code. The P (Y)-Code is the basis for the PPS. The navigation message also modulates the L1-C/A code signal. The navigation message is a 50 Hz signal consisting of data bits that describe the GPS satellite orbits, clock corrections, and other system parameters. Simply, the navigation message tells receiver 16 where the satellite is and which satellite it is at a specified time. When receiver 16 has 4 or more satellite navigation messages, then GPS receiver 16 can triangulate its position.

GPS signal 12 is received by GPS antenna 14. Antenna 14 can be any receiver capable of receiving GPS signal 12, however, antenna 14 is preferably a lightweight antenna, for example the CSI Wireless® 300 KHz beacon antenna. Antenna 14 receives signal 12 and then directs signal 12 to receiver 16. GPS receiver 16 can be any GPS receiver capable of interpreting a GPS signal, however, receiver 16 is preferably a highly integrated, miniature GPS module with dimensions of 38 mm×30 mm×10 mm, for example, based on the SiRFstarIIe® S2AR receiver reference design. The module is preferably mounted on a power supply and interface board and enclosed in an aluminum housing with dimensions of 105 mm×157 mm×40 mm, which help make system 10 very compact and thus portable. The internal power supply board provides all of the necessary internal DC voltages as well as bias voltage for the active antenna. Under normal operating conditions, an illustrative GPS receiver module nominally draws 150 mA @ 9 VDC and the GPS module (Beacon module) active antenna and MBL-3 DGPS (Differential Global Positioning System) antenna nominally draws 230 mA thus assuring system 10 is very power efficient. GPS receiver 16 also preferably contains a second module, for example one with dimensions 46 mm×46 mm×10 mm referred to as the Beacon RF Module (BRFM), that is provided by CSI Wireless® for use with antenna 14. This allows for direct use with any radio beacon DGPS network broadcasting RTCM (Radio Technical Commission Maritime) corrections, which improve the accuracy of a stand-alone GPS position solution. GPS receiver 16 is pre-programmed with the current released version of embedded software, which provides full automatic control of the GPS signal acquisition, signal tracking, navigation signal processing and message output functions. The software allows the user to communicate with the GPS receiver and to monitor all aspects of the GPS signal processing function including position, velocity, time, satellite tracking, etc. All message outputs can be monitored, logged, and saved to file for data analysis under various test scenarios. Two programmable bidirectional RS-232 serial ports or other data transmission media allow logging of either protocol on Port A and/or RTCM correction input on Port B from an independent DGPS correction source. Further, GPS receiver 16 would monitor the integrity of GPS signal 12 either through measured signal strength or by a RAIM (Receiver Autonomous Integrity Monitoring) signal, which allows a bad satellite to be isolated and eliminated when six or more satellites are available.

Preferably user interface 18 is comprised simply of one button located on animal collar 20. In the preferred embodiment, collar 20 would be provided as a base model with perimeter "waypoints" programmed by the user by placing collar 20 at corners of the perimeter. Programming a waypoint would be initiated by pressing the button on collar 20 to establish an internally stored allowable position map. This internally stored allowable position map and various other user configurable parameters are entered into digital signal processor (DSP) 22 by the button on user interface 18. It is contemplated that collar 20 could also have an alphanumerical keypad in which the user could input coordinates of desired waypoints already know to the user. Further, it is contemplated that collar 20 could have a small digital LCD to allow the user to view the exact coordinates he/she is inputting and also view the status and operational modes of system 10. Upon the entry of a final waypoint, preferably a straight line connecting the first and last waypoints may complete the definition of the perimeter. In addition, a more sophisticated unit is contemplated involving a personal computer interface with a RS-232 serial port and graphical user interface software program. This would allow the user to program way points graphically and even dynamically setting the desired perimeter by the time of day or day of the week at a remote personal computer and then downloading all necessary information to processor 22 e.g., through an IR interface or via the RS-232 port.

User interface 18 preferably has LEDs, which are used to communicate information to the user. The LEDs are preferably located on collar 20; however, it is contemplated that they could be located on a remote hand held unit or even graphically represented on the graphical software program described above. In a preferred embodiment there is one red LED and one green LED. The LEDs are used to communicate in a status mode (discussed below) and an operational mode where the user is able to easily clear perimeter parameters, set correction levels (discussed infra), warning zones, etc. through the use of one button. The table below details possible operations controllable by the user.

| Operator Action | Function Performed | LED Response |
| --- | --- | --- |
| Press button once | Waypoint is entered, if the system is in the waypoint setting mode | Flashing green LED |
| Press button twice | Waypoint setting mode, system is ready to accept perimeter waypoints | Green LED blinks twice with a 3 second pause in-between LED blinkings |
| Press button three | End waypoint setting mode, | Red LED blinks twice |

-continued

| Operator Action | Function Performed | LED Response |
| --- | --- | --- |
| times | user is finished entering waypoints. | with a 3 second pause in-between LED blinkings |
| Press button four times | Clear all existing perimeter waypoints including warning perimeter waypoints | Red LED blinks three times with a 5 second pause in-between blinkings |
| Press button five times | Warning perimeter waypoint setting mode, system is ready to accept warning perimeter waypoints | Green LED blinks three times with a 5 second pause in-between LED blinkings |
| Press button six times | Ready to set the shock generation circuitry shock levels: For example, Additional push = low current Additional two pushes = medium current Additional three pushes = high current | Red LED blinks four times with a 10 second interval between blinkings |
| Press button seven times | Ready to set the audio alarm volume levels: For example, Additional push = low volume Additional two pushes = medium volume Additional three pushes = high volume | Green LED blinks four times with a 10 second interval between blinkings |
| Press button eight times | Insert voice command to be used for the audio alarm | Green LED blinks for 5 times with 15 second interval between blinkings |

In the LED status mode the user is able to determine the status of system 10 based upon what LEDs are lit and if they are blinking or not. In a preferred embodiment, the green LED is lit and remains lit when the integrity of GPS signal 12 is above a predetermined acceptable level. When a way point has been accepted into processor 22 then the green LED flashes on and off for a short time period. If signal integrity is lost then the red LED is lit and remains lit until signal 12 acquisition is regained. In addition, if it is detected that battery 28 is low, then the red LED begins flashing and remains flashing until battery 28 is either replaced or recharged. Further, in the event of low battery power, a loss of GPS signal 12, or any other system fault, the red LED will lite or flash, depending on the fault, and audible alarm 24/shock generation circuitry 26 are disabled to prevent accidental warnings/correction to the animal. It is contemplated, however, that the user input/output interface could take many forms without deviating from the sprit of the invention.

Collar 20 can be any typical animal collar and can be made of most any material such as leather or woven fibers. System 10 can be mounted on collar 20 in any fashion such as with a clip or some other fastening device. However, preferably collar 20 has all of the components of system 10 housed onboard (e.g., integrated into collar 20). In the preferred embodiment, all of the components, excluding signal 12, shock generation circuit 26, and collar 20 itself, are inside of a small housing, which may be woven or integrated directly into collar 20. The shock generation circuitry 26 is woven directly into the collar. Electrodes traverse the circumference of collar 20 and make a complete circuit around the animal's neck. The basic function of collar 20 is to provide an attachment for system 10 to the animal, however, it is contemplated that system 10 could be attached to the animal without collar 20, for example, system 10 could be housed within an animal sweater, animal leggings, or even implanted in the animal. Finally, collar 20 has an animal pulse monitoring system. The pulse monitoring system utilizes the electrodes of shock generation circuit 26 to monitor the animal's pulse once a minute to assure that collar 20 has not accidentally fallen off or been removed by the animal. If this occurs, audible alarm 24 instantly activates at the highest volume possible to notify the animal's owner that the animal is without collar 20. To prevent this from occurring when the owner removes collar 20, the owner would simply turn off or remove power to system 10.

Audible alarm 24 and shock generation circuitry 26 are housed upon collar 20 and each provides a deterrent to the animal from remaining in a location not programmed in the internally stored allowable position map as acceptable by the animal's owner. Audible alarm 24 is preferably comprised of a small speaker, e.g., a piezo electric speaker beeper or buzze, which generates an irritating or otherwise notable sound for the animal whenever the animal is within a predetermined distance of the animal's boundary defined by the user or if the animal is within a warning zone set up by the user. Audible alarm 24 receives a signal from processor 22 when the animal is in an area programmed to initiate alarm 24. The irritating sound is preferably initiated at a volume, which is bothersome to the animal, but not auditorily harmful. It is also desired that the volume of audible sound be short in duration and at a volume, which does not aggravate neighbors and/or the animal's owner at inopportune times, such as late at night. The audible sound can be the voice of the animal's owner. The owner can record an audible sound, such as the verbal command "NO" or "RETURN" or an equivalent, directly into the memory located on processor 22. Then upon activation of alarm 24 the animal would hear a recognizable command from its owner and respond accordingly.

Shock generation circuitry 26 is preferably only utilized when the animal does not respond to audible alarm 24 or exits the perimeter defined by the internally stored allowable position map. Shock generation circuitry 26 is generally comprised of electrodes running throughout collar 20 and connected by an electrical conductor traversing the circumference within collar 20. After audible alarm 24 is activated because the animal has come to close to the perimeter or within a warning zone created by the user, processor 22 then determines whether the animal remains in a prohibited location. If the animal does not respond to audible alarm 24 and is still in the prohibitive location then processor 22 initiates a signal to shock circuitry 26, which then generates a small electrical charge on the order of a 1–2 millivolts. If the animal does respond to audible alarm 24 and is not within the prohibitive zone, then no electrical shock/correction is initiated. The electrical charge is uncomfortable for the animal; however, it is not lethal. The purpose of the present invention is not to harm the animal and in accordance with this purpose system 10 can never be set at a shock voltage level that would injure the animal. The electrical charge cannot be activated while the user is inputting the internally stored allowable position map. This prevents the user from accidentally being shocked. Shock circuit 26 can also be deactivated by simply un-strapping or unbuckling collar 20, which in effect creates an open circuit in shock circuit 26 and thus not capable of conducting electricity. Further, shock circuitry 26 has varying levels of shock, which would be dependent on the user's input or upon the animal's actions. For example, if the animal had already received a shock, but had not responded favorably returning within a user defined boundary then a second shock of greater intensity would be initiated.

In a preferred embodiment, battery 28 is a battery clip containing 8 "AA" alkaline batteries at 1.5 VDC/battery to supply 12 VDC to power control circuitry 30. It is contemplated that battery 28 could be comprised of several other batteries, including nickel cadmium, nickel metal hydride, lead acid or lithium battery designs. Utilization of battery 28 is preferred in order to make system 10 light and portable. Further, It is desired that battery 28 be lightweight so that the animal is not burdened with the overall weight of system 10. It is desired to keep the weight of system 10 to less than 8 oz. without battery 28 installed. Battery life will be dependent on the amount of warning/correction activity, however, it is preferable that the batteries last at least a week, without any warnings/corrections, before battery replacement is necessary. It is further contemplated that battery 28 could be augmented by, or omitted from the present invention in exchange for a small solar panel or any other lightweight power source could be used to provide power to circuitry 30.

Power circuit 30 is used to route the proper amount of voltage and current from battery 28 to all devices requiring power. Power circuit 30 also receives inputs from processor 22. In a preferable embodiment, power circuitry 30 is comprised of a voltage divider structure, which divides the inputted 12 VDC from battery 28 into the desired voltage levels for each circuit of system 10. Further, when instructed by processor 22 due to events such as continuous use without a warning/correction or when processor 22 determines that the animal is within the home of the user, power control circuitry 30 can reduce the power consumption of various parts of the circuitry by placing them in a reduced power mode when they are not needed. This extends the life of battery 28.

An accelerometer is a sensor, which converts acceleration from motion or gravity to an electrical signal. An accelerometer can be used to measure inertial forces. The accelerometer serves as a "sourceless" measurement of velocity or distance or force. It can do this because acceleration integrated over time equals the speed an object is going and speed integrated over time results in distance. Inertial force applications include airbag crash sensors, car navigation systems, and elevator control. Accelerometers 40 & 42 can be any acceleration-measuring devices, however, suitable accelerometers 40 & 42 are provided by analog ADXL 202 or 210 low G force accelerometer manufactured by Analog Devices® which measure accelerations less than 10 G with approximately a 5 mG resolution. Accelerometer 40 measures G force acceleration in the X coordinate of the Cartesian coordinate system and accelerometer 42 measures G force acceleration in the Y coordinate. The ADXL 202/210 accelerometers are very good motion detection accelerometers and are desirable since they consume very little power and take up very little space. Therefore, the drain on battery 24 is minimal and system 10 can operate for longer periods of time before battery replacement. Since GPS readings can only be updated once per second, accelerometers can be used to "fill in" the blind time between GPS readings. This prevents an animal from harm and escaping into dangerous areas before the containment system can react. However, it has been discovered that any offset in the accelerometer outputs could be interpreted by the processor's accelerometer inertial guidance algorithm as a constant acceleration. This has the potential to produce large errors in the calculated positions and velocities. Therefore, a high frequency digital filter is implemented to handle these accelerometer offsets. This digital high pass filter removes frequencies lower than 5 Hz to prevent aliasing.

Through testing and experimentation the poles and zeros for the digital high pass filter were determined to be:

$$Poles = \begin{bmatrix} -7.0 - 7.0j \\ -7.0 + 7.0j \end{bmatrix} \quad Zeros = \begin{bmatrix} -1.0 + 0.7j \\ -1.0 - 0.7j \end{bmatrix}$$

Next, by placing the poles and zeros into a rational function of s the following equation results:

$$F(s) = \frac{(s - (-1.0 + .70j)) \cdot (s - (-1.0 - .70j))}{(s - (-7.0 + 7.0j)) \cdot (s - (-7.0 - 7.0j))}$$

This equation expands to:

$$F(s) = \frac{(s^2 + 2.0s + 1.49)}{(s^2 + 14.0s + 98.0)}$$

Converting the equation into the z domain where s=20

$$s = 20 \cdot \frac{z - 1}{z + 1}$$

results in the equation:

$$F(z) = \frac{\left[400 \cdot \frac{(z-1)^2}{(z+1)^2} + 40.0 \cdot \frac{(z-1)}{(z+1)} + 1.49\right]}{\left[400 \cdot \frac{(z-1)^2}{(z+1)^2} + 280.0 \cdot \frac{(z-1)}{(z+1)} + 98.0\right]}$$

This equation simplifies to:

$$.0050 \cdot \frac{(44149z^2 - 79702z + 36149)}{(389z^2 - 302z + 109)} = \frac{U}{E}$$

Then solving for U the equation becomes:

$$1.0U = .567468E - 1.02445\frac{E}{z} + .46464\frac{E}{z^2} + .77635\frac{U}{z} - .280206\frac{U}{z^2}$$

Therefore, the coefficients of the digital high pass filter are 0.567468, −1.02445, 0.46464, 0.77635, and −0.280206. Utilization of the digital high pass filter system 10 produces marked improvement in the efficiency of animal positioning. It is contemplated that this digital high pass filter could be adjusted to produce an ideal filter order, corner frequency, type and phase response. The digital high pass filter provides a filter to remove all frequencies below 5 Hz. It is further contemplated that other filters could be adapted to meet the requirements of the present invention. Further, other methods to correct for the accelerometer offsets are contemplated without deviating from the sprit of the invention.

Sample and hold circuits 36 & 38 are used to sample and hold the outputs of accelerometers 40 & 42 respectively. A sample and hold circuit maintains a constant amplitude analog signal during the analog to digital conversion process. A continuous time analog signal must be sampled at periodic intervals, with a sampling rate of at least twice the highest frequency (bandwidth) of the signal. This is known as the sampling theorem, which ensures that the digitized version (sampled signal) bears all the information of the analog signal. The minimum sampling rate at twice the highest frequency of the signal is called the Nyquist rate.

While the time interval between samples is small enough to satisfy the sampling theorem, the signal amplitude may vary during conversion, especially if the analog to digital conversion is slow. Therefore, the amplitude at each sample must be held constant while the signal is being converted. Preferably sample and hold modules 36 & 38 are LF198 or LF298 monolithic sample and hold circuits such as those manufactured-by National Semiconductor®. Circuits 40 and 42 sample the raw acceleration data from accelerometers 40 and 42 when clocked or instructed to by processor 22. The resulting sampled analog data is then sent to analog to digital converters 32 & 34 where the analog data is converted to digital data.

Most physical signals are continuous in both time and amplitude. Transducers such as accelerometers 40 & 42 produce continuous electrical signals (voltages and currents). To process these analog signals using a digital circuit, such as processor 22; the analog signal coming from sample and hold circuits 36 & 38, must be converted to signals of discrete time and amplitude. This is the function performed by analog to digital converters (A/D) 32 & 34. Converters 32 & 34 take the analog signal from sample and hold circuits 36 & 38 and convert that signal into digital data.

Processor 22 can be any processor but is preferably a digital signal processor such as a DSP56321 manufactured by Motorola®. The digital data is fed into digital signal processor 22, which runs a set of discrete-time difference equations that calculate the velocity and position data. First, processor 22 converts the longitude and latitude position to X and Y plane coordinates with the equations below.

$X$=(current longitude in minutes−reference longitude in minutes)*1852.0*cos(current latitude in degrees)+(double integration of the acceleration in the $X$ coordinate from the accelerometer over the time period from the last GPS fix)

$Y$=(current latitude in minutes−reference latitude in minutes)*1852.0*sin(current latitude in degrees)+(double integration of the acceleration in the $Y$ coordinate from the accelerometer over the time period from the last GPS fix)

The current latitude in minutes minus the reference latitude in minutes multiplied by 1852.0 gives the magnitude of the distance traveled. The cosine or sine of the latitude gives a vector in the direction of the distance traveled away from the reference location. (The reference location is typically a location that is known to the user and inputted or the first GPS location fix obtained by system 10 upon power up.) Next, the distance information obtained by accelerometers 40 & 42 is added to give the final distances in the X and Y coordinates. Therefore, system 10 now has the distance it has traveled and in what direction it has traveled in those distances.

Second, processor 22 converts the velocity into an X vector velocity and a Y vector velocity.

$X_{velocity}$=(velocity magnitude)*cos(heading)+(single integration of the acceleration in the $X$ coordinate from the accelerometer over the time period from the last GPS fix)

$Y$velocity=(velocity magnitude)*sin(heading)+(single integration of the acceleration in the $Y$ coordinate from the accelerometer over the time period from the last GPS fix)

In order to convert from knots to meters per second:

Velocity magnitude=GPS velocity (in knots)*0.514334863217

The magnitude of the velocity is multiplied by the cosine and sine of the heading to provide a vectored velocity. Therefore, the true velocity in the X and Y direction is known. Further, this velocity is added to the velocity information from accelerometers 40 & 42. This data is updated periodically by the true position data as measured by GPS receiver 16. Processor 22 compares its calculated position data with the allowable position map stored in its memory and determines if audible alarm 24 should be sounded and/or a behavior correction voltage should be generated by means of shock generation circuitry 26.

Figure 2:
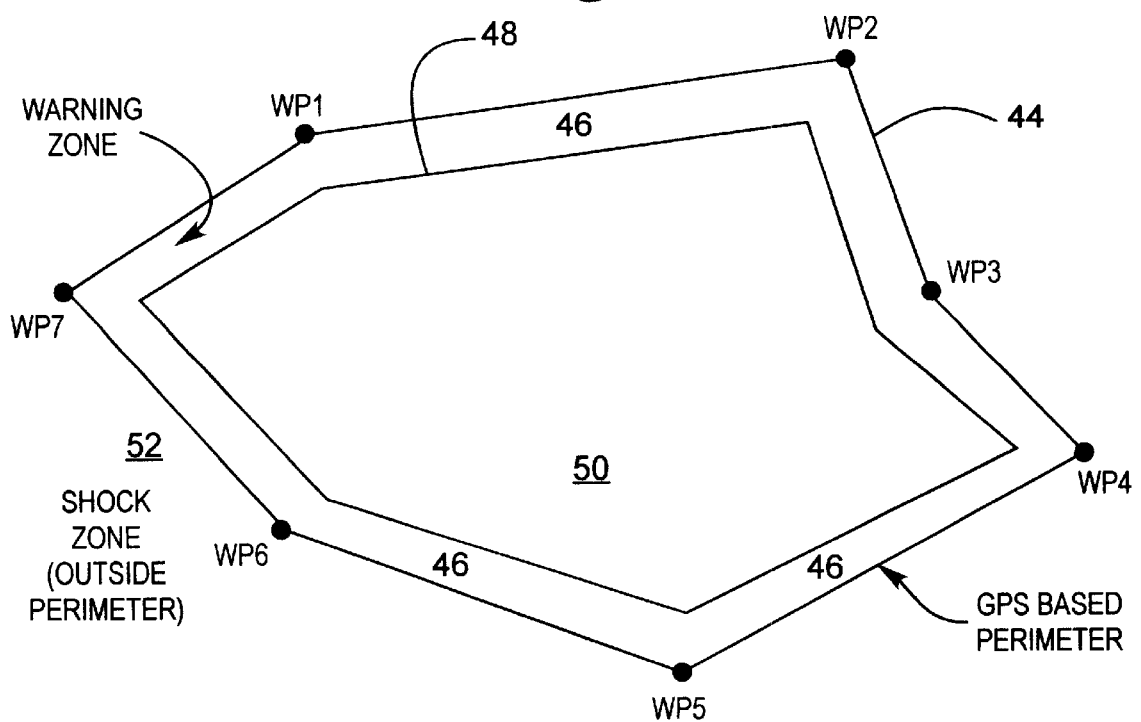
FIG. 2 is a plan diagram of a representative GPS-established initial perimeter according to the invention depicted in FIG. 1.

FIG. 2 is a plan diagram of a representative GPS-established initial perimeter according to the invention depicted in FIG. 1. As part of the initial setup of animal containment system 10, a user must first define an internally stored allowable position map, which comprises a perimeter 44 for which the animal is to be bounded, waypoints which define perimeter 44, audile guard band 46, inside perimeter 48, safe harbor 50, and shock zone 52. In a preferred embodiment, the user may take animal containment system 10 and enter "waypoints", represented by numbers WP1–7, on perimeter 44 by physically locating the collar over the desired waypoint on the ground. The user would start at waypoint 1 and then depress an input button on user interface 18, which inputs waypoint 1's GPS signal into GPS receiver 16. Receiver 16 routes signal 12 to processor 22, which interprets signal 12 into latitude and a longitude and then sends this information to memory located in processor 22. The user then walks to waypoint 2 and repeats the process up to and including, for example, waypoint 7. The invention is preferably implemented so that a virtually unlimited number of waypoints may be selected. When the user indicates that he is finished, i.e., has entered the last waypoint, processor 22 takes the latitudes and longitudes of each waypoint and creates a link between successive waypoints (i.e., 1 to 2, 2 to 3, etc.) up to the last waypoint, which is linked to the first waypoint. Thus, after all of the waypoints are linked, perimeter 44 is formed. Typically, a user would want to use at least three waypoints to define a perimeter, i.e., a triangular perimeter, however, it is contemplated that a user could use two waypoints to define a circle, oval or ellipse, or possibly use one waypoint where the user selects a shape and radius in which the waypoint will be the center of that shape. Further, it is contemplated that the user could indicate via the input mode a perimeter with an open side, which would allow the animal to exit the perimeter and enter a house or a shed without being corrected. It is further contemplated that the waypoints could be entered using a sophisticated interface such as a personal computer and a graphical software program which would allow the user to program waypoints graphically and dynamically based on time of day or day of week. However, for the purpose of the following discussion, manually entered waypoints defining a closed shape will be assumed. These waypoints may be marked initially at least by physical markers to train the animal in the permitted perimeter.

After the user defines perimeter 44, processor 22 calculates audible guard band 46 located between perimeter 44 and inside perimeter 48. The area surrounded by audible guard band 46 creates a safe harbor 50 for the animal; the outside of perimeter 44 being a shock zone 52. Two things are of note at this point, first that animal containment system 10 is preferably self-contained and independent of any ground based equipment (i.e., all equipment is on animal collar 10). Second, animal containment system 10 is not restricted by the power of a fixed transmitter due to GPS receiver 16 and the stored waypoints in processor 22. Further, the user can define their own inside perimeter similar to the creation of outside perimeter 44 and create their own audible warning zone for the animal.

Figure 3:
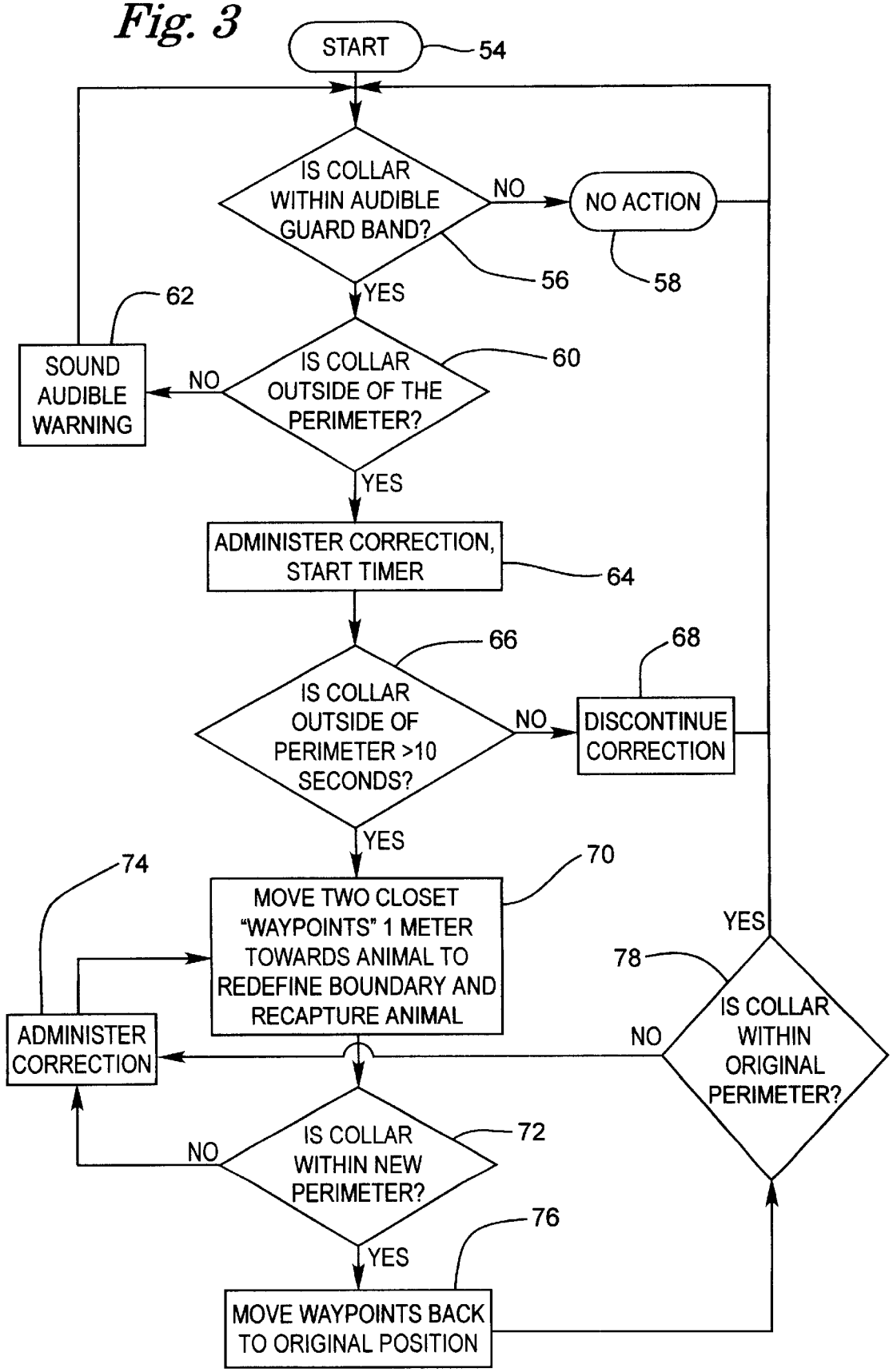
FIG. 3 is a process diagram of the operation of the GPS or GPS/INS animal containment system according to an embodiment of the present invention.
Figure 4:
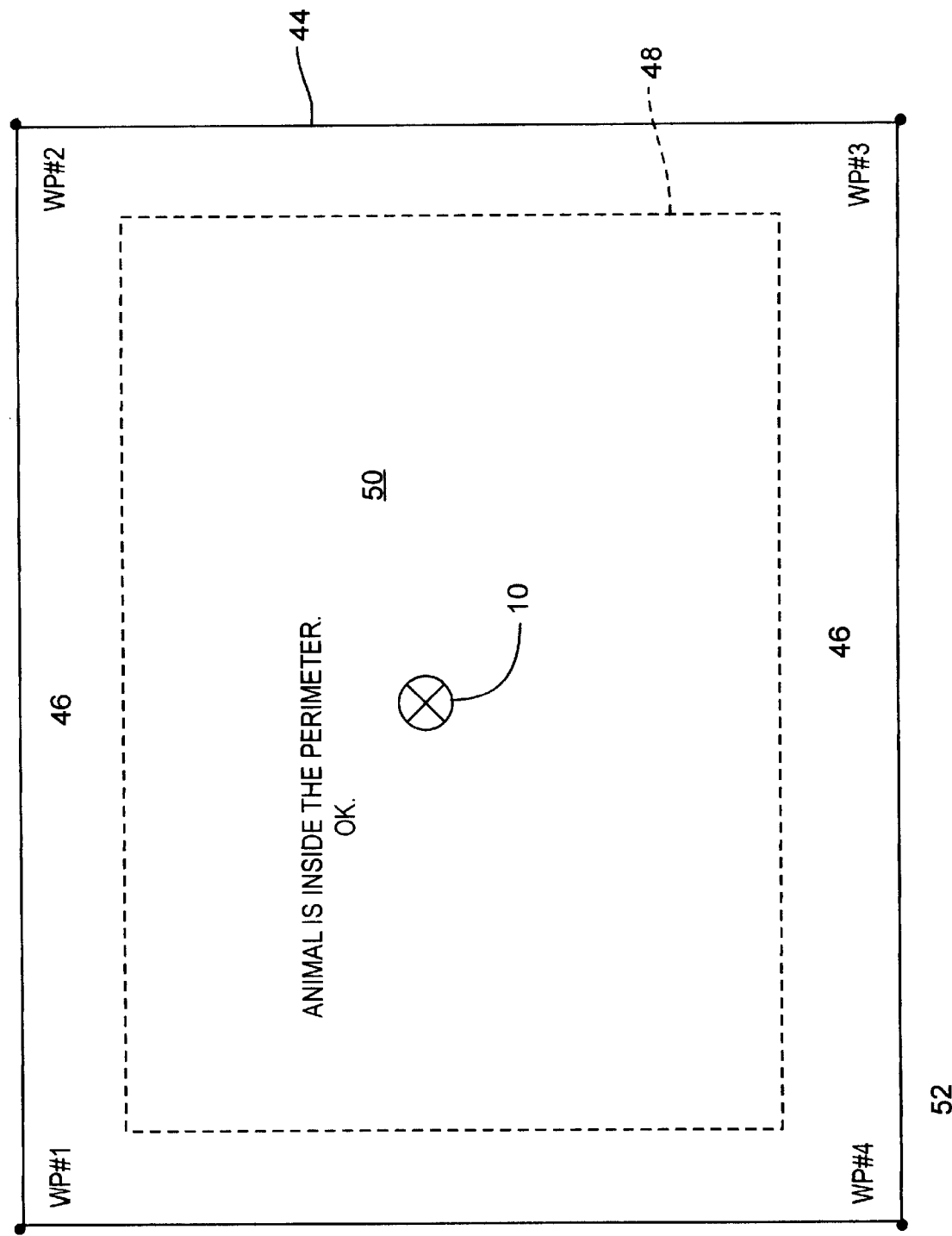
FIG. 4 is a plan diagram depicting the operation of the process depicted in FIG. 3 when the animal is within the perimeter.

FIG. 3 is a process diagram of the operation of GPS or GPS/INS animal containment system 10 according to the GPS/INS embodiment, discussed above, and a dual GPS receiver embodiment, discussed below, of the present invention. FIG. 4 is a plan diagram depicting the operation of the process depicted in FIG. 3 when the animal is within perimeter 44. With reference to FIG. 3, the operation of animal containment system 10 will be discussed. After the internally stored allowable position map has been defined, the user starts the animal containment program represented by state 54. As can be seen with reference to FIG. 4, waypoints 1–4 have been established by the user and are annotated on the figure as WP#1, WP#2, WP#3, and WP#4. With reference to FIGS. 3 & 4, the program begins by querying whether system 10 is within audible guard band 46 represented by state 56. If system 10 is within safe harbor 50, as shown by FIG. 4, then no action is taken, state 58, and the question of state 56 is polled again.

Figure 5:
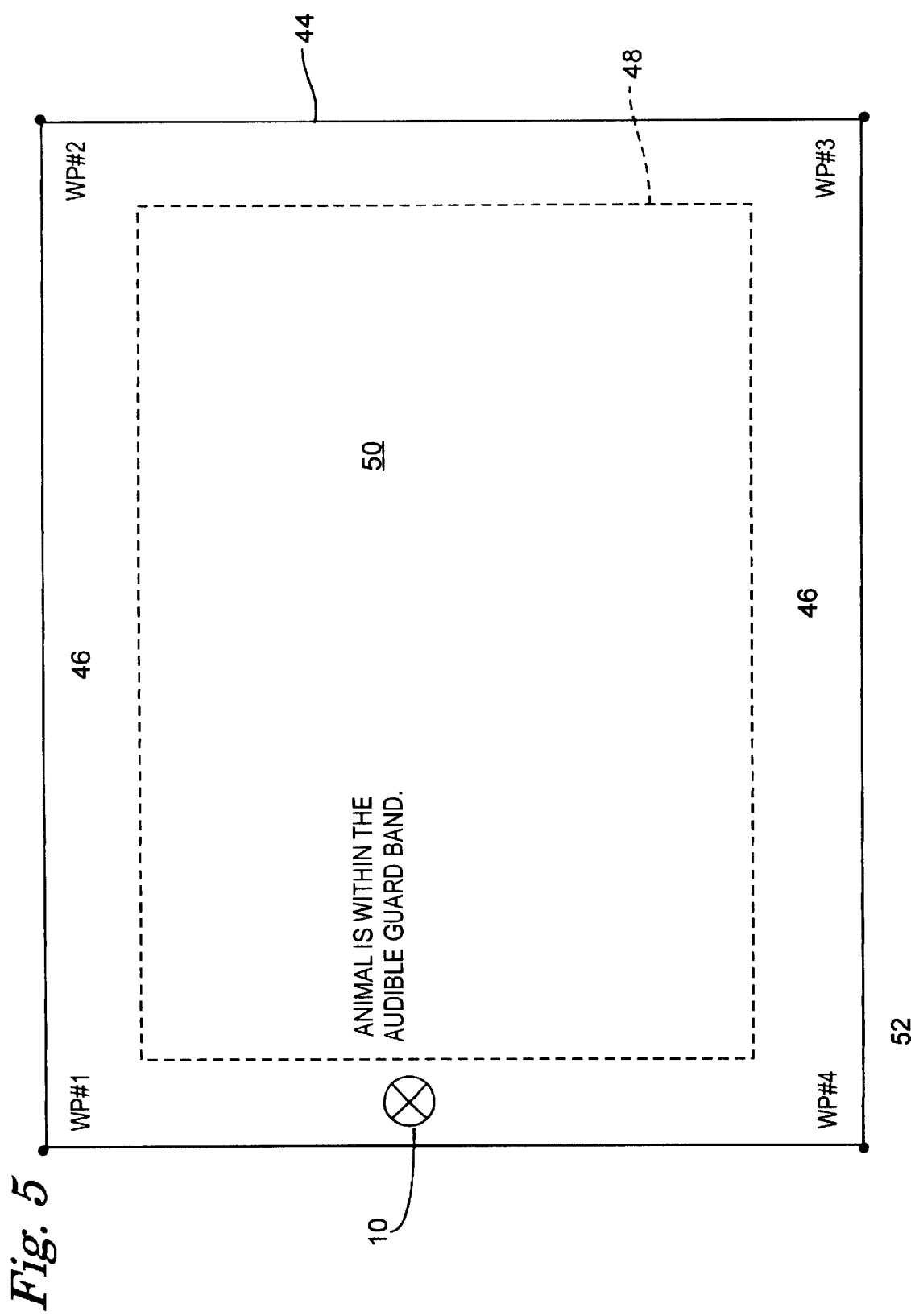
FIG. 5 is a plan diagram depicting the operation of the process depicted in FIG. 3 when the animal is within the audible guard band.

FIG. 5 is a plan diagram depicting the operation of the process depicted in FIG. 3 when the animal is within audible guard band 46. With reference to FIGS. 3 & 5, if system 10 is within audible guard band 46, then the program determines whether system 10 is outside of perimeter 44 represented by state 60. If system 10 is not outside perimeter 44, but within audible band 46, then audible alarm 24 is activated, represented by state 62, encouraging the animal to return to safe harbor 50. After audible alarm 24 is sounded, the program returns to state 56 to determine if system 10 is within warning band 46.

Figure 6:
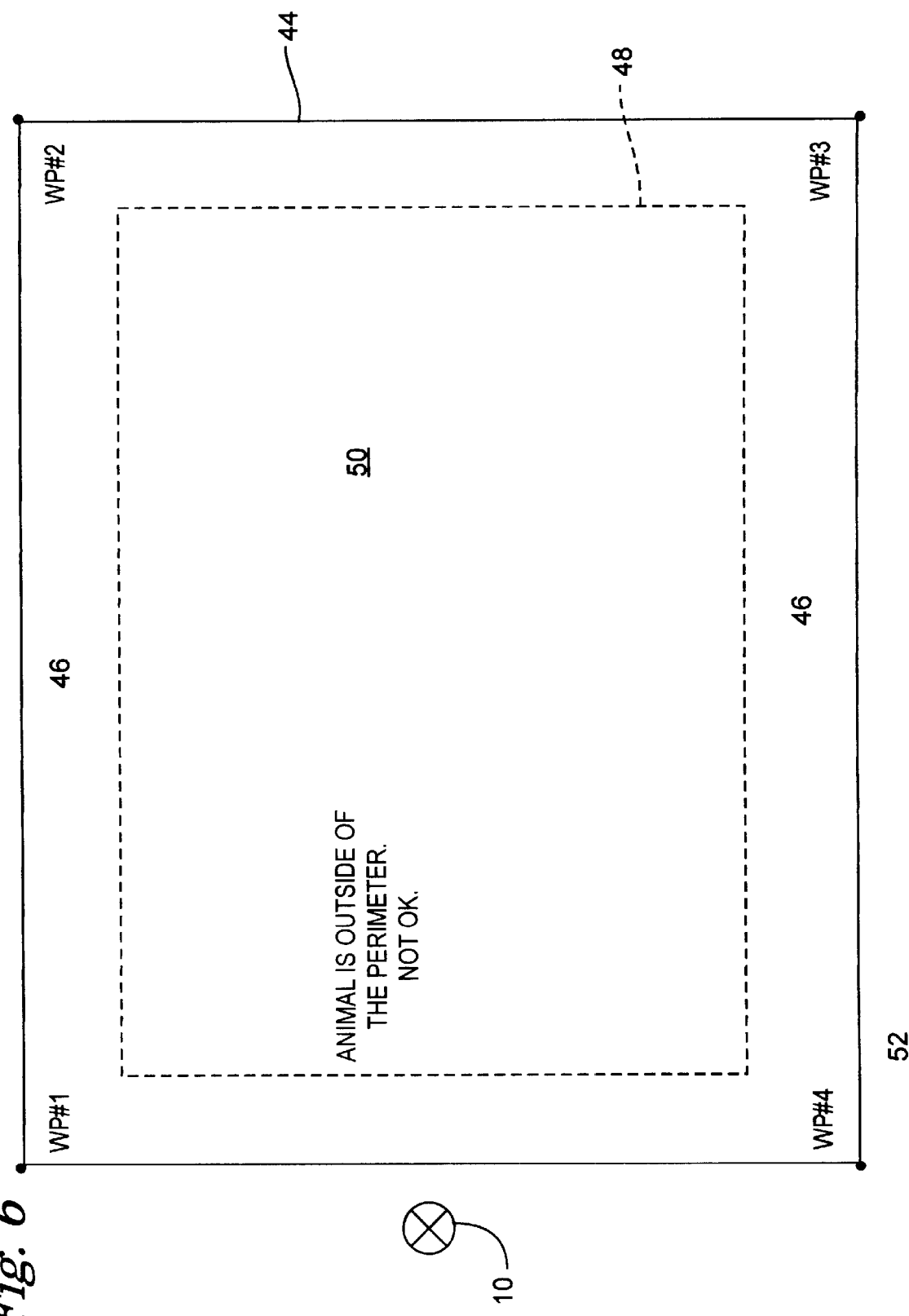
FIG. 6 is a plan diagram depicting the operation of the process depicted in FIG. 3 when the animal is outside of the initial perimeter.

FIG. 6 is a plan diagram depicting the operation of the process depicted in FIG. 3 when the animal is outside of perimeter 44. With reference to FIGS. 3 & 6, if system 10 is outside perimeter 44, then shock generation circuit 26 is activated and an electrical impulse or other correction is administered and a timer started, represented by state 64. After a specified duration of time, e.g., 10 seconds, has elapsed, the program then polls to determine whether system 10 remains outside of perimeter 44, represented by state 66. If system 10 is no longer outside of perimeter 44, represented by FIGS. 4 or 5, then no further correction is administered and the program returns to. state 56 via state 68.

Figure 7:
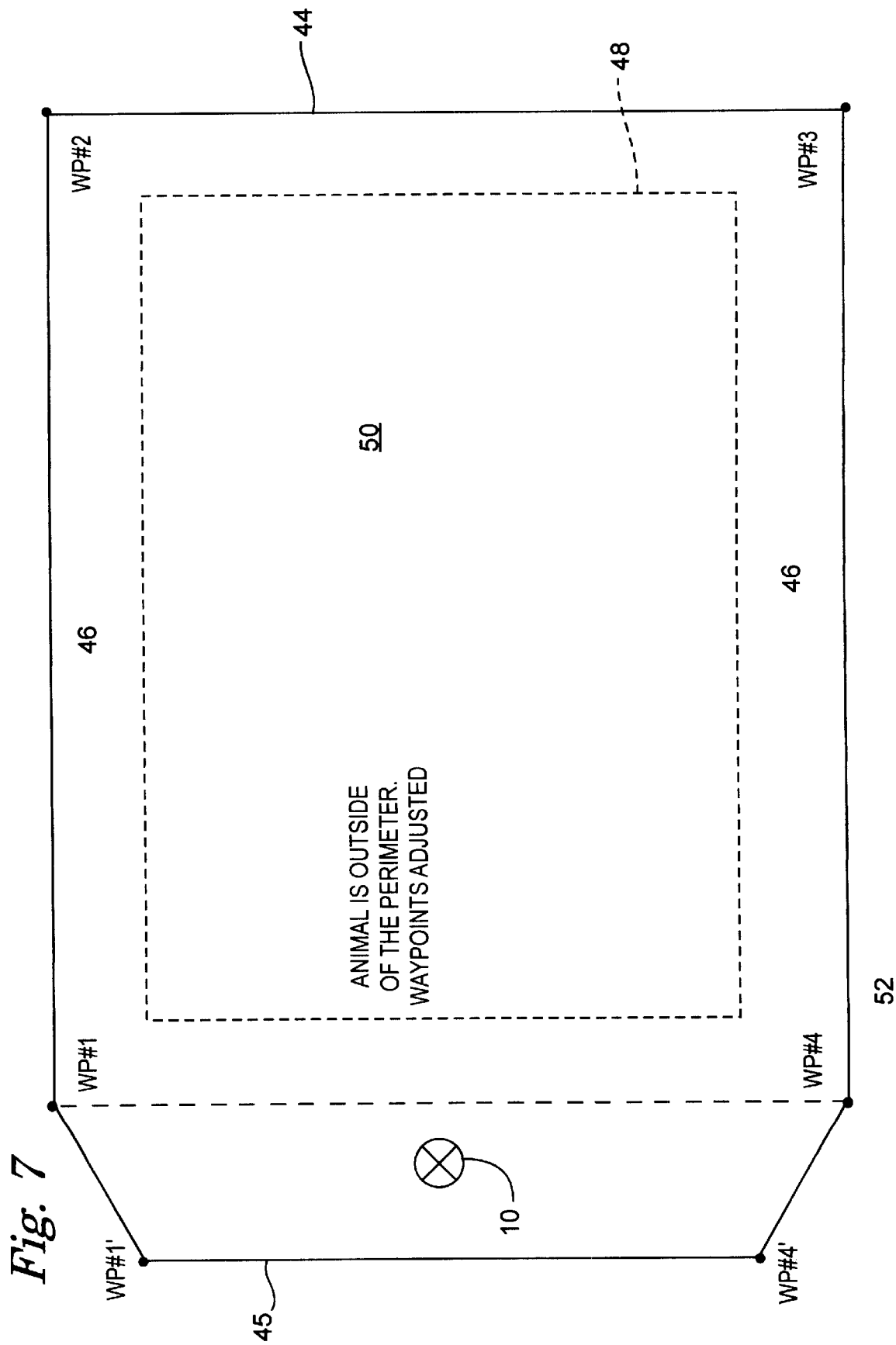
FIG. 7 is a plan diagram depicting the operation of the process depicted in FIG. 3 when the waypoints of the perimeter are dynamically adjusted.

FIG. 7 is a plan diagram depicting the operation of the process depicted in FIG. 3 when the waypoints of perimeter 44 are dynamically adjusted. With respect to FIGS. 3 & 7, if system 10 remains outside of perimeter 44, then the program moves the nearest two waypoints (WP#1 & WP#4) away from the central axis of the perimeter, but angled toward the direction of the straying animal to create two new waypoints (WP#1' & WP#4'). The waypoints are moved in the general direction of travel of the animal, as indicated by the section of the perimeter breached. The waypoints also preferably angle in toward the animal, e.g., 15° toward system 10, in order to limit the enlargement of perimeter 44. It is desired to keep the expansion of perimeter 44 to a minimum to reduce the possibility of expanding perimeter 44 into a hazard for the animal such as expanding the perimeter into busy street or into a pool.

In an alternative embodiment, the waypoints may move a specified distance from the original waypoints, or may move out a specified lateral distance along a set or variable angle possibly determinable by the user. This angle may vary, for example, based on the location of the animal outside original perimeter 44. In order to further limit the amount of expansion from original perimeter 44 an alternative embodiment can limit the movement of waypoints to at least one waypoint. A greater number of waypoints may define a more specific expansion more narrowly tailored to encompass an animal's new position without permitting an unduly large expansion of perimeter 44. For example, a four-cornered user-defined rectangular perimeter having four waypoints may be automatically split up into equidistant sections along each side, thus providing for multiple waypoints located in a straight line along the border defined by the user's original two corner waypoints. The number of automatically generated waypoints along a user-defined boundary may be limited, for example, only by the computational power of the processor incorporated into the device, or may also be selected according to the size of the animal being contained. In an embodiment of the invention in which the number of waypoints along a boundary may be virtually unlimited, waypoints may be selected to define an envelope of expansion where the waypoints are not adjacent, but which define an envelope or bulge in the perimeter which has not yet been violated by the animal. Further, it is contemplated that in an embodiment having a practically unlimited number of waypoints, each waypoint could be extended out in such a fashion as to create a semicircle or any other geometric shape.

As depicted in FIG. 7, and according to an embodiment in which only corner waypoints 1 and 4 are adjusted upon perimeter breach, corner waypoints 1 and 4 move a distance along a vector, a vector, for these purposes, being a value having length and direction. The vector may be created using, for example, the direction of travel of system 10 and the system's distance from original perimeter 44 together with a vector of the current position of system 10 relative to original waypoint 1 & 4.

Figure 8:
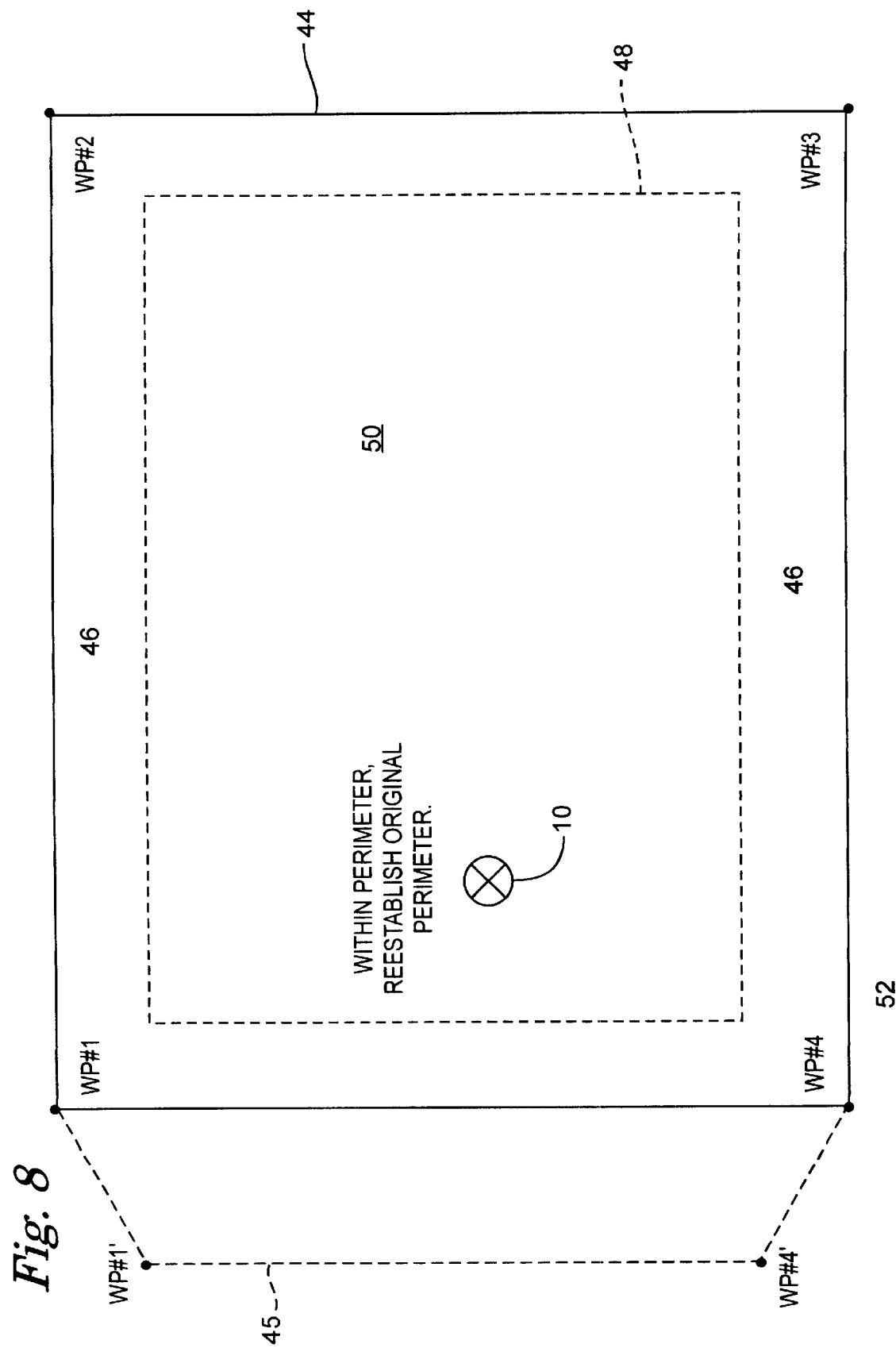
FIG. 8 is a plan diagram depicting the operation of the process depicted in FIG. 3 when the adjusted waypoints of the perimeter are dynamically adjusted to their original position.

FIG. 8 is a plan diagram depicting the operation of the process depicted in FIG. 3 when the adjusted waypoints of the perimeter are dynamically adjusted to their original position. With respect to FIGS. 7 & 8, original waypoints 1 and 4 are moved toward the animal creating new waypoints, 1' and 4', thus redefining perimeter 44 to new perimeter 45, represented by state 70 in FIG. 3. The program then polls whether system 10 is within new perimeter 45 of FIG. 7, indicated by state 72 in FIG. 3. If system 10 is not within new perimeter 45, another correction may be administered, represented by state 74. The program depicted by the state diagram of FIG. 3, moves the nearest two waypoints 1 meter, for example, along a vector defined by the animal's direction of travel and the animal's location towards the animal thus redefining new perimeter 45, box 70. However, if system 10 is within new perimeter 45, then processor 22 of FIG. 1 moves waypoints 1' and 4' depicted in FIG. 7 back to their original position 1 and 4 effectively reestablishing perimeter 44 represented by state 76 of FIG. 3 and as depicted in FIG. 8. The program then polls whether system 10 is within original perimeter 44 represented by box 78.

Alternatively, instead of establishing new waypoints 1' and 4' and polling to determine whether system 10 is within new perimeter 45 i.e., determining in effect whether the new perimeter 45 encompasses the new position of system 10, instead new waypoints 1' and 4' may be established which are known at least instantaneously to contain system 10. In other words, waypoints 1 and 4 are changed so as to create a new perimeter 45, which will, at least instantaneously, encompass the current location of system 10. Thereafter, polling for collar location within new perimeter 45 may continue as previously (i.e., before the animal has breached original perimeter 44). This latter embodiment will prevent a situation where an animal is repeatedly corrected while standing still, although the embodiment will also allow an animal to remain outside original perimeter 44 indefinitely.

In yet another embodiment, the problem of repeated corrections may be solved by initially creating new perimeter 45 to encompass the new animal position, thus allowing the subject animal to remain out of original perimeter 44 uncorrected. Thereafter, new perimeter 45 may be "tightened", or drawn in closer over a gradual period of time, e.g., 1 minute, 5 minutes, 10 minutes, 1 hour, or other predetermined period to original perimeter 44. This may be expected to prompt the animal to return to original perimeter 44, but will preferably not repeatedly or continuously correct an animal that does not, for whatever reason, return to original perimeter 44. Preferably, a combination of perimeter expansion and restriction methods may be made available to a user, allowing the user to select a method that is appropriate to the subject animal's behavior, temperament and intelligence, perhaps determined through use of the system, including being an automatically determined appropriate method defined by the system.

In another embodiment, any correction administered only when the animal is standing still may be limited to a audible warning only, i.e., without a shock or other relatively unpleasant correction. If system 10 is within original perimeter 44, then the program returns to state 56 from state 78 of FIG. 3 to determine whether system 10 is within warning band 46. However, if system 10 is not within original perimeter 44 state 78, preferably another correction is administered, represented by state 74 of FIG. 3. This correction may be of an increased duration or intensity compared to a previous correction following breach of an original perimeter. Following this correction, again the program moves the nearest two waypoints 1 meter towards animal thus redefining a new perimeter established in state 70, as represented in the plan view FIG. 7.

Figure 9:
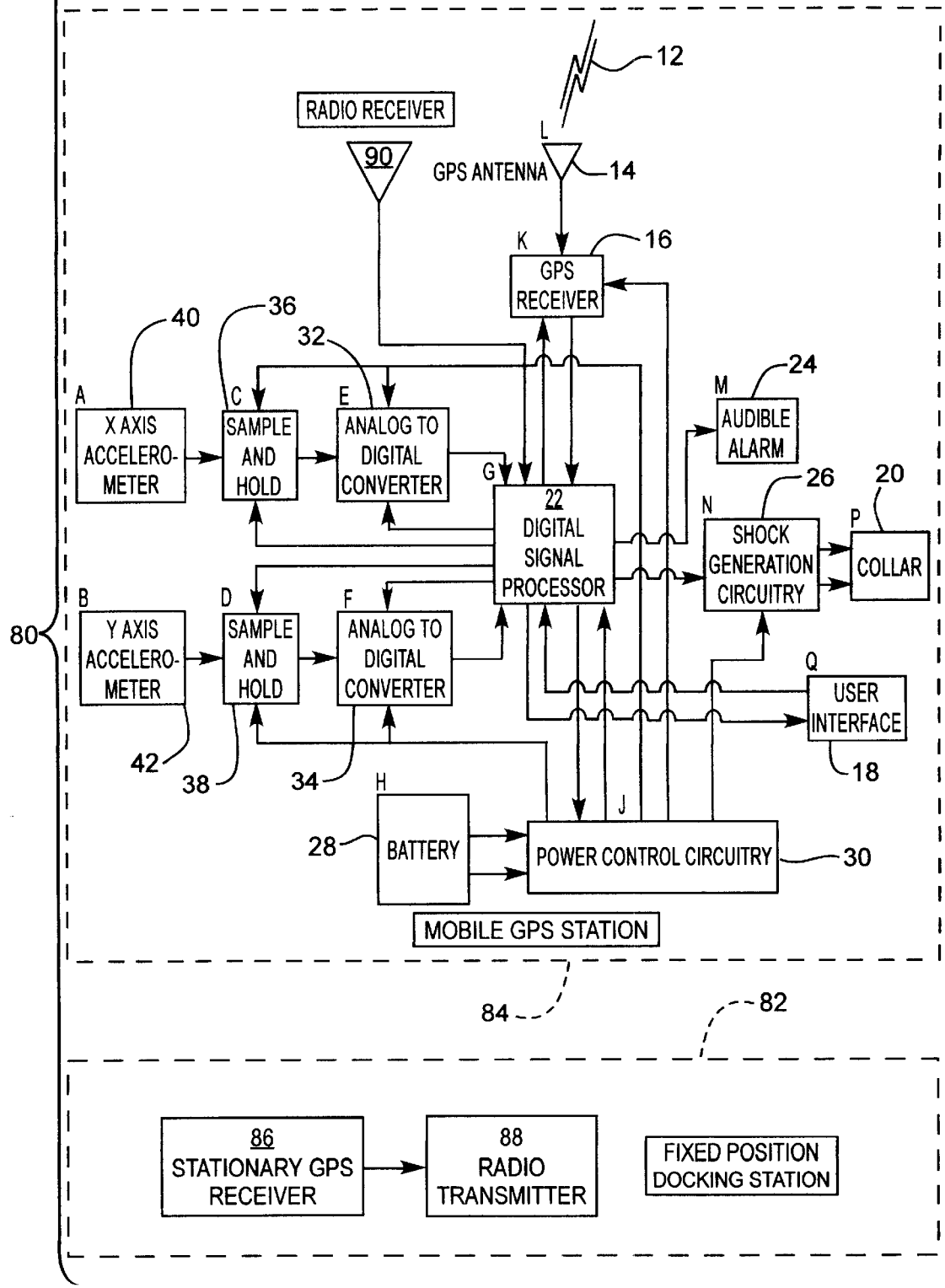
FIG. 9 is a schematic diagram of a GPS/INS pseudo-differential animal containment system.

FIG. 9 is a schematic diagram of a GPS/INS pseudo-differential animal containment system 80. System 80 is comprised of a fixed position docking station 82 and a mobile GPS system 84. Fixed station 82 is comprised of a stationary GPS receiver 86 and a radio transmitter 88. Mobile system 84 is comprised similarly to system 10 and preferably has an incoming GPS signal 12, a GPS antenna 14, a GPS receiver 16, a user interface 18, an animal collar 20, a digital signal processor or microprocessor (processor) 22, an audible alarm circuit 24, shock generation circuit 26, a battery 28, power control circuitry 30, analog-to-digital converters 32 and 34, sample and hold circuits 36 and 38, an X-axis accelerometer 40, a Y-axis accelerometer 42, and radio receiver antenna 90. Although analog-to-digital converters 32 and 34, sample and hold circuits 36 and 38, X-axis accelerometer 40, and Y-axis accelerometer 42 are present within differential system 80 it must be noted that these components are not necessary elements to this embodiment and could be omitted according to design considerations. These components may also be considered additional components utilized only in the event that radio receiver 90 or any component of fixed station 82 become inoperative.

In a preferred embodiment, fixed station 82 is comprised of a small housing, which holds stationary receiver 86 and transmitter 88. Preferably station 82 is placed in an open out of the way location, which optimally will receive GPS signals without interference. Further, because station 82 is small it can be placed almost anywhere without taking away from the aesthetic value of the animal owner's property. Receiver 86 is preferably the same as receiver 16 and includes an antenna (not shown) similar to antenna 14, however both receiver 86 and its antenna can be any GPS receiver and antenna, however, it is preferable that both receiver 86 and its antenna are light in weight and small in size so as to be easily installable for the user and somewhat unnoticeable for the aesthetic reasons discussed above. Transmitter 88 and receiver 90 can be any typical radio frequency transmitter and receiver as long as they are compatible with each other. For example, receiver 90 may be an MC33592 RF Receiver manufactured by Motorola® and transmitter 88 may be an MC33493 RF Transmitter manufactured by Motorola®.

With reference to FIG. 9, a preferred embodiment of the present invention is shown; system 80 utilizes a low cost GPS/INS pseudo-differential technique to improve the accuracy of a GPS-based locating system at low cost. The embodiment consists of two GPS receivers 16 & 86, one being a mobile receiver 16 and the other a stationary (e.g., fastened to the user's house) receiver 86 linked together via radio frequency transmissions, however, it is contemplated that receivers 16 & 86 could be linked by infrared transmissions or any other type of communications without deviating from the spirit of the invention. Stationary unit 82 establishes its position over time by taking repetitive fixes and then uses statistical analysis to determine a precise position. It is contemplated that stationary unit 82 could also be inputted with a known latitude and longitude utilizing precision mapping or the like. After unit 82 knows its location it then checks and corrects signals received from the GPS satellites. Stationary GPS receiver 86 then sends a correction factor to mobile GPS receiver 16 through radio transmitter 88 also in fixed position docking station 82, to radio receiver 90 located in mobile station 84. This embodiment differs from others in that it utilizes a GPS receiver at a known position to determine the errors that affect GPS receivers, either instantaneously or chronically at the location of the system, and then corrects the errors through an RF link. The error is determined by comparing a known position of a stationary unit with the GPS determined location derived from the GPS satellite signals. Further, through testing pseudo-differential system 80 has shown a slightly better position accuracy than GPS/INS system 10.

Figure 10:
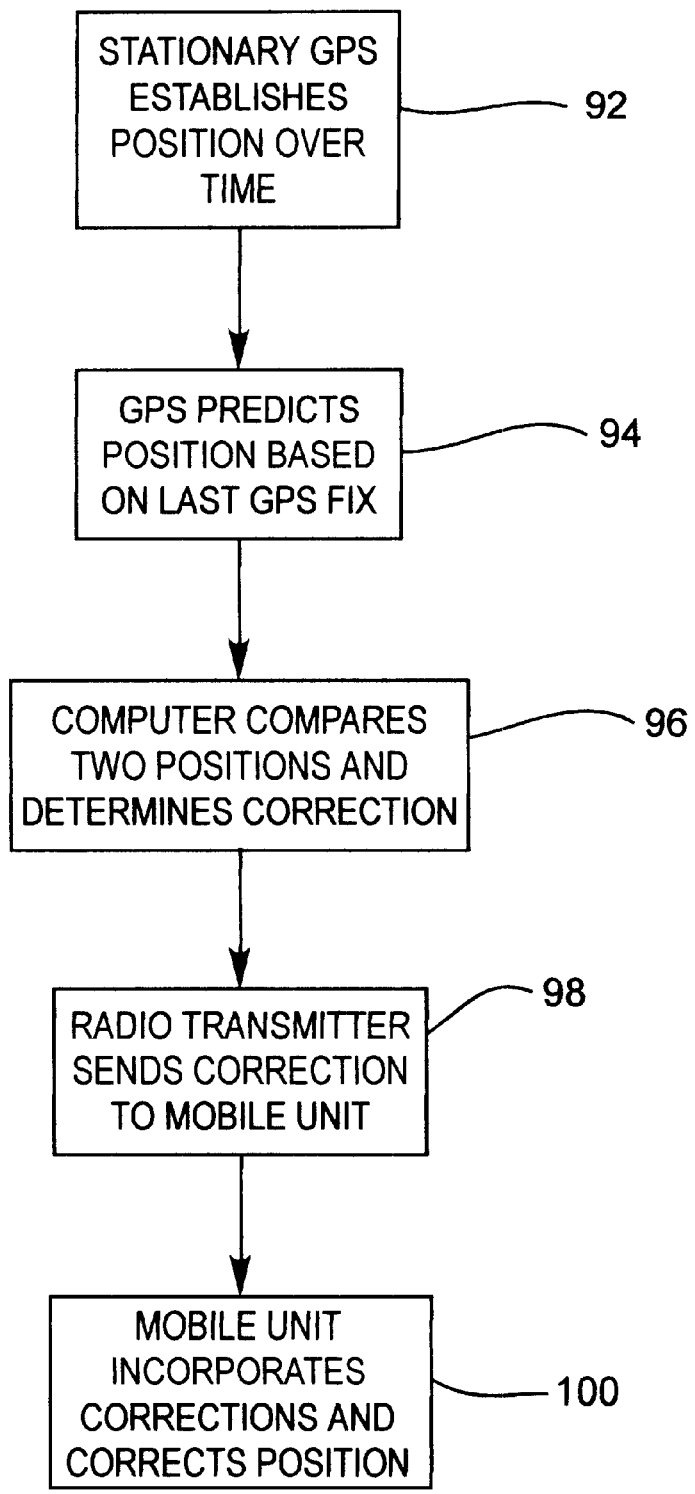
FIG. 10 is a process diagram of the operation of the present invention according to an embodiment utilizing a GPS/INS pseudo differential animal containment system error correcting process.

FIG. 10 is a process diagram of the operation of the present invention according to an embodiment utilizing a GPS/INS pseudo-differential animal containment system error correcting process as depicted in FIG. 9. With respect to FIG. 10, the error correction procedure is shown in a flow diagram. First, as discussed above, stationary GPS receiver 86 preferably establishes its position over time by repetitiously acquiring GPS positions and then utilizing statistical analysis to determine receiver's 86 most likely true position, as represented by state 92. Then receiver 86 acquires the latest GPS position fix, represented by state 94. The receiver then compares the known position to the latest GPS position fix and determines what the signal error is and then calculates a correction to the signal, represented in state 96. Radio transmitter 88 in docking station 82 then transmits the signal correction factor to mobile station 84 through receiver 90 to processor 22 as represented by state 98. Mobile unit 84 then incorporates the signal correction and accordingly modifies its apparent position based on the signal correction represented by state 100.

The operation of animal containment system 80 as shown in FIG. 3 preferably remains the same as system 10 of FIG. 1. However, position accuracy is improved and thus the possibility of applying correction or sounding an audible warning incorrectly is reduced. It is noted that many other systems can be used to increase positional accuracy without departing from the sprit of the invention, for example, by correcting for GPS variation by means of a multiaxis accelerometer that tracks motion from an initial or known location, or between GPS transmissions or signal receptions.

Figure 11:
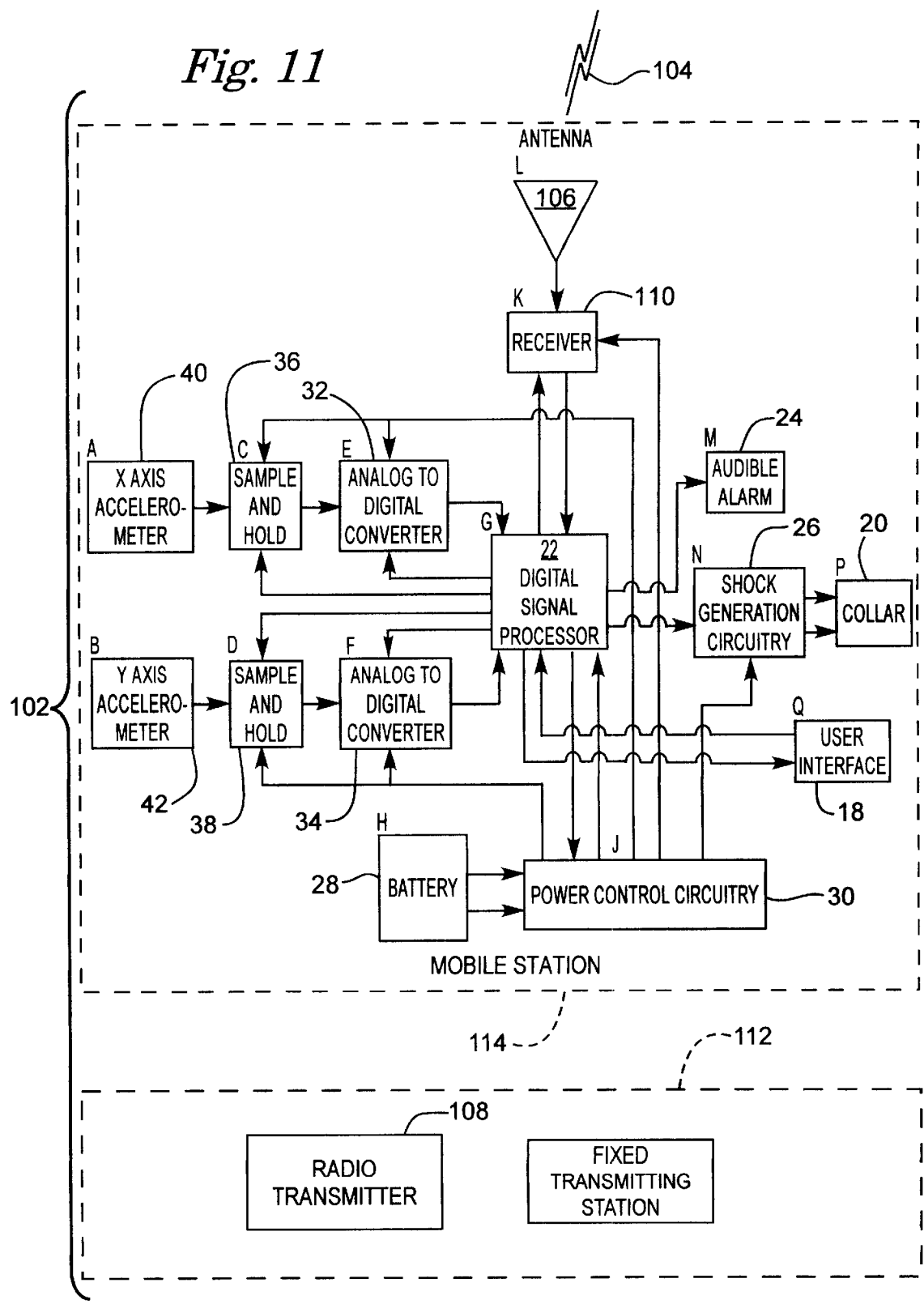
FIG. 11 is a component diagram of an implementation of the present invention utilizing an RF transmitter/receiver.

FIG. 11 is a component diagram of an implementation of the present invention utilizing an RF transmitter/receiver. With reference to FIG. 11, an alternative embodiment for an animal containment system 102 is comprised similarly to system 80 having a user interface 18, an animal collar 20, a digital signal processor or microprocessor (processor) 22, an audible alarm circuit 24, shock generation circuit 26, a battery 28, power control circuitry 30, analog-to-digital converters 32 and 34, sample and hold circuits 36 and 38, an X-axis accelerometer 40, a Y-axis accelerometer 42, an incoming radio frequency signal 104, a radio frequency antenna 106, a radio frequency receiver 110, and a radio frequency transmitter 108. Although analog-to-digital converters 32 and 34, sample and hold circuits 36 and 38, X-axis accelerometer 40, and Y-axis accelerometer 42 are present within RF containment system 102 it must be noted that these components are not necessary to this embodiment and could be extracted without any effect on the embodiment. These components are considered additional components utilized only in the event that transmitter 108 or receiver 110 becomes inoperative.

Radio transmitter 108 is housed within fixed transmitting station 112 and similar to differential system 80 station 112 is a small housing which can be discreetly mounted on the animal owner's property. Radio transmitter 108 can be any type of transmitter, for example, an MC33493 RF Transmitter manufactured by Motorola®. Radio receiver 110 is housed within mobile station 114 and can be any type of radio receiver, including an MC33592 RF Receiver manufactured by Motorola®. It is contemplated that fixed station 112 and mobile station 114 could be linked by infrared transmissions or any other type of communications without deviating from the spirit of the invention.

Figure 12:
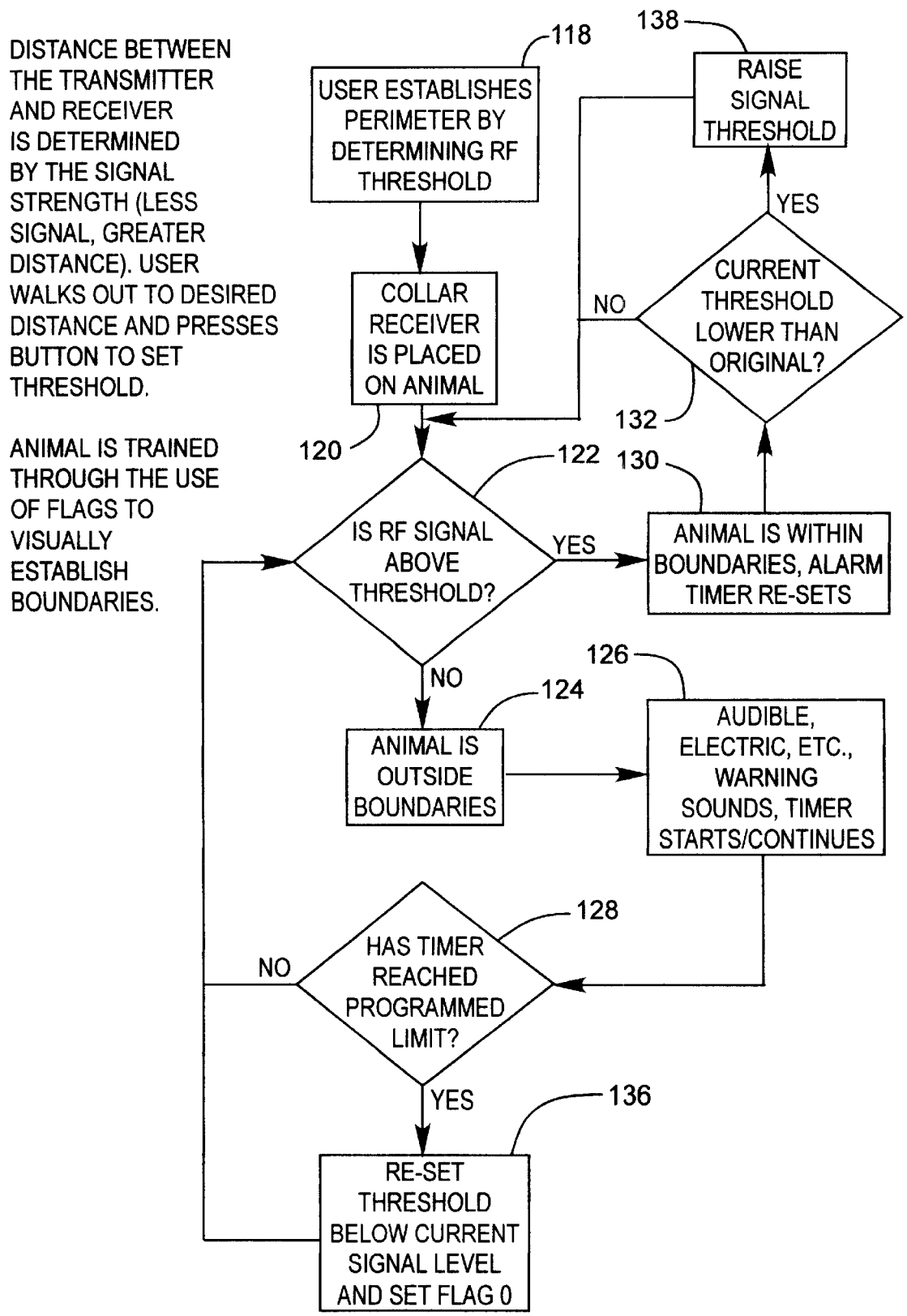
FIG. 12 is a process diagram depicting the operation of the animal containment system depicted in FIG. 11 of the RF transmitter/receiver animal containment system.

FIG. 12 is a process diagram depicting the operation of the RF transmitter/receiver animal containment system 102 depicted in FIG. 11. FIG. 13 is a plan diagram depicting the operation of the animal containment system shown in FIG. 11 depicting the dynamically moving perimeter of the RF transmitter/receiver animal containment system 102. With reference to FIGS. 12 and 13, the operation of animal containment system 102 is discussed. The user firsts establishes a desired perimeter 116 by pressing input buttons on user interface 18 to establish a threshold RF signal at distance $D_A$ represented by state 118. The distance between transmitter 108 and receiver 110 is determined by the signal strength (i.e., smaller signal strength equates to a greater distance and vice versa). The distance established for perimeter 116 by a threshold RF signal is then stored in processor 22.

Collar 20 is then placed on the animal, represented by state 120. The program in processor 22 then queries whether RF signal 104 is above the threshold established in processor 22 as represented in state 122. If the RF signal is not above the threshold, this means the animal at distance $D_C$ is outside of user-defined perimeter 116 at distance $D_A$ as represented by state 124. Thus $D_C>D_A$, and audible alarm 24 is activated, correction generation circuit 26 is activated, and the alarm timer (not shown) is started as represented in state 126. The program then queries whether the timer has reached a preprogrammed limit as represented in state 128 of FIG. 12.

If the preprogrammed limit has not been reached then the program returns to state 122 and queries whether RF signal 104 is above the user-defined threshold. If the animal is still outside of perimeter 116, then the program moves to state 124 and then to state 126 and another audible warning is sounded, another correction is administered, and the timer continues to increment and the program moves to box 128 to determine if the timer has reached the preprogrammed limit.

However, if RF signal 104 is above the threshold at state 122 of FIG. 12, this means the animal at distance $D_B$ has returned to within perimeter 116 at distance $D_A$ as represented by state 130. Thus $D_A>D_B$ and audible warning is not sounded and the alarm timer (not shown) is reset. Next the program queries whether the current threshold is higher than the original threshold as represented by state 132. Since the threshold was never adjusted, the answer to the query is no because the current threshold equals the original threshold. Thus the program moves to state 122 where once again the program asks whether RF signal 104 is above the user-defined threshold.

Returning to state 128, if the animal never returned to within perimeter 116 and the timer has reached the preprogrammed limit, then the program resets the threshold below the current signal level threshold and resets the timer, thus creating new perimeter 134 as represented in state 136. New perimeter 134 is established at distance $D_D$, where $D_D>D_C>D_A$. The program then moves to state 122 where it queries whether RF signal 104 is above the new threshold established in state 136.

If RF signal 104 is above the new threshold at state 122, this means the animal at distance $D_C$ is within perimeter 134 at distance $D_D$ as represented by state 130. Thus $D_D>D_C$ and audible warning is not sounded and the alarm timer (not shown) is reset. Next the program queries whether the current threshold is lower than the original threshold as represented by state 132. Since the threshold was adjusted, the answer to the query is yes because the current threshold is less than the original threshold. Thus the program moves to state 138 where the program raises the signal threshold. This process is repeated until the current threshold equals the original threshold. This means that the animal is within user-defined perimeter 116.

However, if RF signal 104 is not above the new threshold, this means the animal is outside of new perimeter 134 as represented by state 124. Thus audible warning is sounded again, correction is administered again and the alarm timer (not shown) is started as represented in state 126. The program then queries whether the timer has reached a preprogrammed limit as represented in state 128. If the preprogrammed limit has not been reached then the program returns to state 122 and queries whether RF signal 104 is above the newly defined threshold. If the animal is still outside of new perimeter 134, then the program moves to state 124 and then to state 126 and another audible warning is sounded, another correction is administered, and the timer continues to increment and the program moves to state 128 to determine if the timer has reached the preprogrammed limit. At state 128, if the animal never returned to within perimeter 134 and the timer has reached the preprogrammed limit, then the program resets the threshold below the current signal level threshold and resets the timer, thus creating another new perimeter as represented in state 136. This process is repeated until the animal returns within the newly-established perimeter established by the program. Thus the invention creates a dynamically-adjusting perimeter to contain an animal and assist in corralling the animal when the animal has escaped initial perimeter 116.

It will be appreciated that the present invention can take many forms and embodiments. The true essence and spirit of this invention are defined in the appended claims, and it is not intended that the embodiment of the invention presented herein should limit the scope thereof. For example, a correction may be administered, in addition to sound and electrical impulse, by other suitable corrective stimuli, e.g., a citronella burst, water squirt, or other aversive stimuli.

An example of an alternative embodiment could have off-limits area (e.g., a garden) inside of or in addition to the perimeter, which contains the animal. In this instance the animal would not only be corrected after leaving the perimeter, but would also be corrected if in an off-limits area defined by the user and directed out of the off limits area.

In an alternative embodiment, the invention could define a grazing animal's permitted grazing area that may be gradually and dynamically shifted over a period of time, so that a grazing area could then be moved within a larger area to prevent overgrazing. The subject being confined may typically be an animal, however, other subjects may be similarly signaled when they are leaving a defined area according to the present invention. Additionally, the present invention may provide for notification of an animal custodian, or central monitoring authority of perimeter breach by a subject. This notification may take place, for example, via RF transmissions, or RF transmission to a module having dialing capabilities for further transmission over POTS or another point-to-point communications media.

What is claimed is:

1. An apparatus for providing a dynamically-changing confinement perimeter for a subject comprising:
   a portable unit for attachment to the subject, said portable unit comprising:
      a receiver that receives signals providing spatial information and;
      a processor comprising:
         a memory containing user-defined boundary data;
         a comparator that receives said spatial information and compares
         said spatial information against said user-defined boundary data and determines if portable unit is within a perimeter defined by said user-defined boundary data;
         a perimeter modifier by which said processor dynamically alters the user-defined boundary data to create one or more new perimeters encompassing the portable unit if the portable unit is moved outside of a perimeter.

2. The apparatus as set forth in claim 1, wherein the user-defined boundary data is inputtable into said memory by a user physically transporting the portable unit along a user-chosen boundary and entering waypoints defining said perimeter, at least one waypoint being established by received spatial information from said receiver corresponding to the physical position of the portable unit upon entry of said waypoint.

3. The apparatus as set forth in claim 2, wherein the portable unit is a collar designed to be attached to an animal.

4. The apparatus as set forth in claim 3, further comprising an audible alarm circuit programmed to sound an alarm if the portable unit is within a predetermined distance of a perimeter.

5. The apparatus as set forth in claim 4, further comprising a correction generation circuit that provides a correction to the animal if the animal crosses a perimeter.

6. The apparatus as set forth in claim 5, wherein the processor is adapted to periodically compare spatial information of the portable unit with the spatial information of the first new perimeter and determine if the portable unit is within a first new perimeter.

7. The apparatus as set forth in claim 6, wherein the processor is adapted to dynamically change an initial perimeter to create a subsequent perimeter encompassing the portable unit upon at least a first event of if the portable unit being moved outside of the initial perimeter.

8. The apparatus as set forth in claim 7, wherein said received signals received by said receiver are Global Positioning Signals.

9. The apparatus as set forth in claim 7, wherein said received signals received by said receiver are Radio Frequency Signals.

10. The apparatus as set forth in claim 8, further comprising:
    a stationary GPS receiver separate from said portable unit for satellite positional data adapted to compare a known stationary position with a satellite-derived position; and
    an error correction component to adjust for errors in the satellite-derived position.

11. The apparatus as set forth in claim 10 further comprising an RF transmitter adapted to transmit an error correction signal for errors that exist in the satellite-derived position.

12. The apparatus as set forth in claim 11, wherein said portable unit further comprises an RF receiver adapted to receive the error correction signal; and an error compensating component adapted to correct the satellite-derived position.

13. The apparatus as set forth in claim 8, further comprising an accelerometer, wherein the processor is adapted to receive acceleration data from the accelerometer and provide updated spatial data for the portable unit in combination with the spatial data of the portable unit.

14. The apparatus as set forth in claim 13, wherein the accelerometer data is gathered from a 2-axis accelerometer.

15. The apparatus as set forth in claim 13, wherein the accelerometer data is gathered from a 3-axis accelerometer.

16. The apparatus as set forth in claim 9; further comprising an RF transmitter separate from said portable unit adapted to transmit a predetermined signal at a predetermined threshold.

17. The apparatus as set forth in claim 16, wherein the portable unit further comprises an RF receiver adapted to receive the transmitted signal for use by the processor.

18. The apparatus as set forth in claim 17, wherein the processor is adapted to compare a received signal threshold to the imputed signal threshold signal defining the perimeter data in the memory to determine if the portable unit is within said perimeter.

19. A method for providing a dynamically-changing confinement perimeter for a subject comprising:
    attaching a portable unit to the subject, the portable unit having a memory;
    receiving to said portable unit signals providing spatial information;
    providing an initial boundary;
    comparing received said spatial information against spatial data corresponding to a user-defined boundary;
    determining if portable unit is within said initial boundary; and
    modifying an existing boundary to create at least one subsequent boundary encompassing the portable unit upon the occurrence of the portable unit being moved outside of the initial boundary.

20. The method as set forth in claim 19, wherein the step of providing an existing boundary comprises the steps of:
    inputting a perimeter into said memory by transporting the portable unit along a user-chosen boundary; and
    establishing said waypoints by receiving spatial data corresponding to the physical position of the portable unit at the time of waypoint establishment, and storing said spatial data into said memory.

21. The method as set forth in claim 20, wherein the portable unit is a collar designed to be attached to an animal.

22. The method as set forth in claim 21, further comprising the step of sounding an audible alarm if the portable unit is within a predetermined distance of a boundary.

23. The method as set forth in claim 22, further comprising the step of imparting a correction to the animal if the animal crosses a boundary.

24. The method as set forth in claim 23, further comprising the steps of periodically comparing the spatial data of the portable unit with the spatial data of a subsequent boundary and determining if the portable unit is within said subsequent boundary.

25. The method as set forth in claim 24, further comprising the step of changing the existing boundary to create a subsequent boundary encompassing the portable unit in response to the portable unit being moved exterior to the existing boundary.

26. The method of claim 25, further comprising the step of returning an existing boundary to a prior boundary upon the portable unit being moved to the interior of the prior boundary.

27. The method as set forth in claim 25, wherein said received signals received by said receiver are Global Positioning Signals.

28. The method as set forth in claim 25, wherein said received signals received by said receiver are Radio Frequency Signals.

29. The method as set forth in claim 27, further comprising the steps of:
   comparing a known stationary position from a stationary GPS receiver with a satellite-derived position of the stationary GPS receiver; and
   determining if errors exist in the satellite-derived position.

30. The method as set forth in claim 29; further comprising the step of transmitting an error correction signal to impart a correction for errors that exist in the satellite-derived position.

31. The method as set forth in claim 30, further comprising the steps of:
   receiving the error correction signal at said portable unit; and
   correcting the received GPS signal in accordance with said error correction signal.

32. The method as set forth in claim 27, further comprising the steps of:
   receiving acceleration data from an accelerometer; and
   combining the spatial data of the portable unit with the accelerometer data to provide updated spatial data for the portable unit.

33. The method as set forth in claim 32, wherein the accelerometer data is gathered from a 2-axis accelerometer.

34. The method as set forth in claim 32, wherein the accelerometer data is gathered from a 3-axis accelerometer.

35. The method as set forth in claim 28 further comprising the step of transmitting a RF predetermined signal at a predetermined threshold.

36. The method as set forth in claim 35, further comprising the steps of:
   receiving at the portable unit the transmitted predetermined signal;
   transferring it to a processor contained on the portable unit;
   comparing a received predetermined signal to a threshold signal defining the at least one waypoint in the memory; and
   determining if the portable unit is within the user-defined perimeter.

* * * * *